United States Patent
Yu et al.

(10) Patent No.: US 11,487,168 B2
(45) Date of Patent: Nov. 1, 2022

(54) LIQUID CRYSTAL PANEL AND DISPLAY DEVICE

(71) Applicant: BOE TECHNOLOGY GROUP CO., LTD., Beijing (CN)

(72) Inventors: Meina Yu, Beijing (CN); Hyun Sic Choi, Beijing (CN); Pengxia Liang, Beijing (CN); Xiaochuan Chen, Beijing (CN); Zheng Fang, Beijing (CN); Xue Dong, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/281,289

(22) PCT Filed: Jan. 13, 2020

(86) PCT No.: PCT/CN2020/071817
§ 371 (c)(1),
(2) Date: Mar. 30, 2021

(87) PCT Pub. No.: WO2021/142582
PCT Pub. Date: Jul. 22, 2021

(65) Prior Publication Data
US 2022/0121055 A1 Apr. 21, 2022

(51) Int. Cl.
*G02F 1/1337* (2006.01)
*G02F 1/1343* (2006.01)
*G02F 1/1339* (2006.01)

(52) U.S. Cl.
CPC ........ *G02F 1/13439* (2013.01); *G02F 1/1337* (2013.01); *G02F 1/13394* (2013.01)

(58) Field of Classification Search
None
See application file for complete search history.

(56) References Cited

U.S. PATENT DOCUMENTS

| | | | |
|---|---|---|---|
| 9,513,505 B2 | 12/2016 | Xie | |
| 9,791,746 B2 | 10/2017 | Song et al. | |
| 2005/0083470 A1* | 4/2005 | Ono | G02F 1/13439 349/143 |
| 2008/0002079 A1* | 1/2008 | Kimura | G02F 1/134363 349/141 |
| 2009/0033848 A1* | 2/2009 | Oka | G02F 1/134363 349/114 |

(Continued)

FOREIGN PATENT DOCUMENTS

| CN | 102830549 | 12/2012 |
|---|---|---|
| CN | 103176307 | 6/2013 |

(Continued)

*Primary Examiner* — Ryan Crockett
(74) *Attorney, Agent, or Firm* — Leason Ellis LLP

(57) ABSTRACT

A liquid crystal panel and a display device are disclosed. The liquid crystal panel includes a first substrate, a second substrate, and a liquid crystal layer. The first substrate includes a first base substrate, and a pixel electrode and a common electrode provided on the first base substrate. The second substrate is opposed to the first substrate and includes a second base substrate. The liquid crystal layer is provided between the first substrate and the second substrate in a direction perpendicular to the first base substrate. An initial alignment of liquid crystal in the liquid crystal layer is vertical alignment.

17 Claims, 11 Drawing Sheets

(56) References Cited

U.S. PATENT DOCUMENTS

| | | | |
|---|---|---|---|
| 2009/0109381 A1 | 4/2009 | Haruyama | |
| 2011/0310337 A1* | 12/2011 | Ishihara | G02F 1/1395 349/123 |
| 2012/0154730 A1* | 6/2012 | Sakurai | G02F 1/134363 349/141 |
| 2012/0169981 A1* | 7/2012 | Murata | G02F 1/134363 349/138 |
| 2014/0055723 A1* | 2/2014 | Du | G02B 5/201 359/487.01 |
| 2014/0118671 A1* | 5/2014 | Aoyama | G02F 1/134363 349/138 |
| 2014/0132906 A1* | 5/2014 | Yoshioka | G02F 1/134309 349/141 |
| 2015/0146125 A1* | 5/2015 | Kita | G02F 1/1368 349/33 |
| 2015/0153619 A1* | 6/2015 | Murata | G02F 1/137 349/123 |
| 2015/0253633 A1* | 9/2015 | Tsuchiya | G02F 1/134309 349/96 |
| 2016/0363809 A1* | 12/2016 | Kesho | G02F 1/133345 |
| 2017/0322470 A1* | 11/2017 | Iwata | G02F 1/134363 |

FOREIGN PATENT DOCUMENTS

| | | |
|---|---|---|
| CN | 203825339 | 9/2014 |
| CN | 105204232 | 12/2015 |
| CN | 105739195 | 7/2016 |
| CN | 105807511 | 7/2016 |

\* cited by examiner ure. By applying a data voltage to the common electrode and the pixel electrode, the deflection of liquid crystal molecules is controlled, and in turn the light passing through the liquid crystal panel is controlled.
LIQUID CRYSTAL PANEL AND DISPLAY DEVICE

CROSS-REFERENCE TO RELATED PATENT APPLICATIONS

This application is a U.S. National Stage Application under 35 U.S.C. § 371 of International Patent Application No. PCT/CN2020/071817, filed Jan. 13, 2020, which is incorporated by reference in its entirety.

TECHNICAL FIELD

Embodiments of the disclosure relates to a liquid crystal panel and a display device.

BACKGROUND

Advanced Super Dimension Switch (ADS) technology is widely used in various display devices due to its advantages of high resolution, high light-transmittance, low power consumption, wide viewing angle, high aperture ratio, and low chromatic aberration. In the current ADS liquid crystal display device, the array substrate includes a pixel electrode and a common electrode located in different layers. For example, one of the pixel electrode and the common electrode has a plate-shape structure, and the other of the pixel electrode and the common electrode has a slit-shape structure. By applying a data voltage to the common electrode and the pixel electrode, the deflection of liquid crystal molecules is controlled, and in turn the light passing through the liquid crystal panel is controlled.

SUMMARY

According to embodiments of the disclosure, a liquid crystal panel and a display device are provided, the liquid crystal panel at least alleviates the light leakage in the dark state.

According to the embodiments of the disclosure, the liquid crystal panel is provided, which comprises: a first substrate, comprising a first base substrate, and a pixel electrode and a common electrode provided on the first base substrate; a second substrate, opposed to the first substrate and comprising a second base substrate; and a liquid crystal layer, provided between the first substrate and the second substrate in a direction perpendicular to the first base substrate. An initial alignment of liquid crystal in the liquid crystal layer is vertical alignment.

For example, the first substrate comprises a first alignment layer provided on the first base substrate, and the second substrate comprises a second alignment layer provided on the second base substrate; each of the first alignment layer and the second alignment layer is in direct contact with the liquid crystal layer, and the first alignment layer and the second alignment layer are configured to allow the initial alignment of the liquid crystal to be vertical alignment.

For example, the liquid crystal in the liquid crystal layer is negative liquid crystal.

For example, the first substrate comprises a first electrode layer and a second electrode layer sequentially provided on a side of the first base substrate facing toward the liquid crystal layer, the first electrode layer is provided between the first base substrate and the second electrode layer in the direction perpendicular to the first base substrate; the second electrode layer comprises a plurality of second electrode strips provided at intervals, and one of the pixel electrode and the common electrode is provided in the second electrode layer and comprises the plurality of second electrode strips; the other of the pixel electrode and the common electrode is provided in the first electrode layer and comprises a part that extends beyond the second electrode layer in a direction parallel to the first base substrate.

For example, the first electrode layer comprises a plate-shaped structure which is continuous, and orthographic projections of the plurality of second electrode strips on the first base substrate are within an orthographic projection of the plate-shaped structure on the first base substrate.

For example, the first electrode layer comprises a plurality of first electrode strips provided at intervals, and the other of the pixel electrode and the common electrode comprises the plurality of first electrode strips; orthographic projections of the plurality of first electrode strips on the first base substrate partially overlap orthographic projections of the plurality of second electrode strips on the first base substrate.

For example, the first electrode layer comprises a plurality of first electrode strips provided at intervals, and the other of the pixel electrode and the common electrode comprises the plurality of first electrode strips; orthographic projections of the plurality of first electrode strips on the first base substrate are outside orthographic projections of the plurality of second electrode strips on the first base substrate.

For example, the second substrate further comprises a first enhancement electrode provided on a side of the second base substrate facing toward the liquid crystal layer; the first enhancement electrode is configured in such a way that a non-zero voltage difference is generated between the first enhancement electrode and at least one of the pixel electrode and the common electrode during operation of the liquid crystal panel.

For example, the first enhancement electrode comprises a plate-shaped structure which is continuous, and orthographic projections of the plurality of second electrode strips on the first base substrate are within an orthographic projection of the first enhancement electrode of the plate-shaped structure on the first base substrate.

For example, the first enhancement electrode comprises a plurality of third electrode strips provided at intervals, and orthographic projections of the plurality of third electrode strips on the first base substrate are staggered with orthographic projections of the plurality of second electrode strips on the first base substrate.

For example, the first enhancement electrode is configured to be applied with a signal during the operation of the liquid crystal panel, the signal is different from a signal applied to the pixel electrode and is different from a signal applied to the common electrode during the operation of the liquid crystal panel.

For example, the first enhancement electrode is electrically connected to the common electrode; or, the first enhancement electrode is electrically connected to the pixel electrode.

For example, the liquid crystal panel further comprises a sealant configured for connecting the first substrate to the second substrate, an electrically-conductive connection portion is provided in the sealant, and the first enhancement electrode is electrically connected to the pixel electrode or the common electrode through the electrically-conductive connection portion; or, the liquid crystal panel further comprises a plurality of spacers provided between the first substrate and the second substrate, and the first enhanced electrode is electrically connected with the pixel electrode or the common electrode at a position of a spacer, closest to an edge of the liquid crystal panel, among the plurality of spacers.

For example, each of the plurality of second electrode strips has a width ranged from 2.0 microns to 3.8 microns, and a spacing between adjacent second electrode strips is ranged from 1.8 microns to 5.4 microns.

For example, each of the plurality of second electrode strips has a width ranged from 1.9 microns to 3.3 microns, and a spacing between adjacent second electrode strips is ranged from 2.3 microns to 4.8 microns.

For example, the first substrate further comprises an insulating layer, the insulating layer is provided between the first electrode layer and the second electrode layer in the direction perpendicular to the first substrate, and the insulating layer has a thickness ranged from 100 mm~2000 nm.

For example, the pixel electrode and the common electrode are provided in a same layer;
the second substrate further comprises a first enhancement electrode provided on a side of the second base substrate facing toward the liquid crystal layer; the first enhancement electrode is configured in such a way that a non-zero voltage difference is generated between the first enhancement electrode and at least one of the pixel electrode and the common electrode during operation of the liquid crystal panel.

For example, the second substrate further comprises a second enhancement electrode provided on the second base substrate and insulated from the first enhancement electrode; the first enhancement electrode and the second enhancement electrode are configured to be applied with different signals during the operation of the liquid crystal panel.

For example, one of the first enhancement electrode and the second enhancement electrode is electrically connected to the pixel electrode, and the other of the first enhancement electrode and the second enhancement electrodes is electrically connected to the common electrode.

According to the embodiments of the disclosure, a display device is provided, which comprises: the liquid crystal panel as described in any one of the above embodiments; and a backlight source. The backlight source is provided on a side of the first substrate facing away from the second substrate.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, the technical terms or scientific terms here should be of general meaning as understood by those ordinarily skilled in the art. In the descriptions and claims of the present disclosure, expressions such as "first", "second" and the like do not denote any order, quantity, or importance, but rather are used for distinguishing different components. Expressions such as "include" or "comprise" and the like denote that elements or objects appearing before the words of "include" or "comprise" cover the elements or the objects enumerated after the words of "include" or "comprise" or equivalents thereof, not exclusive of other elements or objects. Expressions such as "connect" or "interconnect" and the like are not limited to physical or mechanical connections, but may include electrical connections, whether direct or indirect. Expressions such as "up", "down", "left", "right" and the like are only used for expressing relative positional relationship, the relative positional relationship may be correspondingly changed in the case that the absolute position of a described object is changed.

Figure 1:
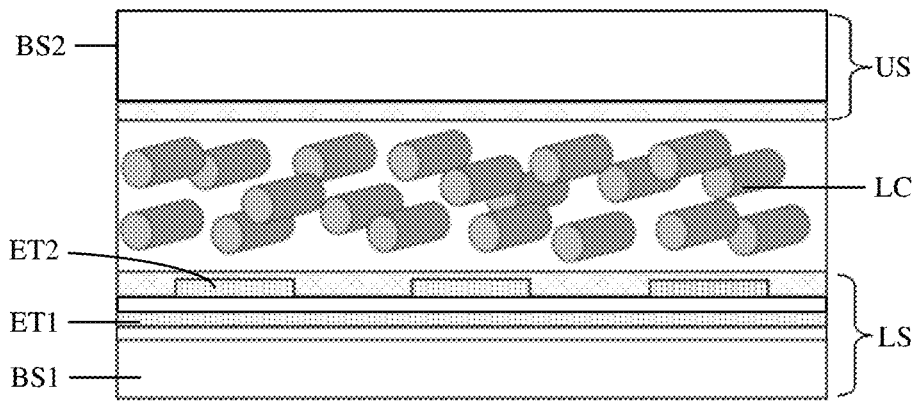
FIG. 1 is a schematically structural diagram of a horizontal electric field type ADS (Advanced Super Dimension Switch) liquid crystal panel.

FIG. 1 is a horizontal electric field type ADS (Advanced Super Dimension Switch) liquid crystal panel. As shown in FIG. 1, the ADS liquid crystal panel includes a lower substrate LS and an upper substrate US opposed to each other, and further includes a liquid crystal layer LC between the lower substrate LS and the upper substrate US. The lower substrate LS includes a base substrate BS1, and a common electrode ET1 and a pixel electrode ET2 are located on the base substrate BS1. The common electrode ET1 has a plate shape and the pixel electrode ET2 has a strip shape. For example, the liquid crystal layer LC in the ADS type liquid crystal panel shown in FIG. 1 uses positive liquid crystals. Under zero electric field (that is, the voltage V between the pixel electrode ET2 and the common electrode ET1 is zero, V=0V), an alignment direction of the liquid crystal is approximately parallel to the upper substrate US and the lower substrate LS, and the alignment direction of the liquid crystal (that is, a direction of a long axis of the liquid crystal) is approximately parallel to an extending direction of the strip-shaped pixel electrode. In the case that the electric field is turned on, a direction of the electric field is directed from the upper strip-shaped pixel electrode ET2 to the lower common electrode ET1, that is, the direction of the electric field is perpendicular to the extension direction of the strip-shaped pixel electrode ET2; in this situation, the liquid crystal is electropositive (dielectric anisotropy coefficient $\Delta\varepsilon>0$) and is rotated to be aligned along the direction of the electric field, thus an in-plane rotation occurs.

Inventors of the present disclosure notice that, under zero electric field, due to a deviation of an optical axis of the liquid crystal (that is, the deviation between an actual angle and an designed angle of a long-axis direction of the liquid crystal), a deviation of an optical path difference between ordinary light (O light) and extraordinary light (E light) after light passing through the liquid crystal, a deviation of an optical axis of a polarizer, or other factors, the ADS liquid crystal display panel shown in FIG. 1 has light leakage in a dark state, which causes the ADS liquid crystal display panel to have relatively large brightness (L0) in a dart state and further causes a low contrast.

The embodiments of the present disclosure provide a liquid crystal panel and a display device including the liquid crystal panel. The liquid crystal panel includes a first substrate and a second substrate opposed to each other, and a liquid crystal layer interposed between the first substrate and the second substrate. The first substrate includes a pixel electrode and a common electrode for forming a horizontal electric field, and an initial alignment of liquid crystal in the liquid crystal layer is vertical alignment (that is, in the case that no electric field is formed between the pixel electrode and the common electrode, long-axis directions of most liquid crystal molecules in the liquid crystal layer are approximately perpendicular to each of the first substrate and the second substrate).

In the embodiments of the present disclosure, an alignment direction of the liquid crystal in the liquid crystal layer in an initial state (that is, in zero electric field state, it also means that an voltage difference (that is, an driving voltage) between the pixel electrode and the common electrode is zero) is approximately perpendicular to the substrates (i.e., the first substrate and the second substrate). For example, a pre-tilt angle of the liquid crystal molecule (an angle between the long-axis direction of the liquid crystal molecule and a surface of the substrate) approximately ranges from 87° to 93°. In the case that the liquid crystal is vertically aligned, a refractive index of the liquid crystal in optical-axis direction of each of two polarizers is $n_o$ (that is, the refractive index of O light). In this situation, the liquid crystal is not sensitive to the deviation of the optical axis of the polarizer. Compared with the liquid crystal panel shown in FIG. 1, the liquid crystal panel provided by the embodiments of the present disclosure alleviates the light leakage in the dark state, thereby increasing the contrast.

It should be noted that in the embodiments of the present disclosure, "approximately" means that the deviation between a designed value and an actual value is within tolerated error range.

In order to achieve that the initial alignment of the liquid crystal is vertical alignment, in some embodiments, for example, PSVA (Polymer Stabilized Vertically Aligned) technology is adopted. The PSVA technology involves adding a polymerizable monomer to the liquid crystal, and then applying a voltage to the liquid crystal so that the polymerizable monomer is polymerized into a polymer network, which causes the vertical alignment of the liquid crystal.

In other embodiments, an alignment layer is used to achieve that the initial alignment of the liquid crystal is vertical alignment. For example, the first substrate includes a first alignment layer on a first base substrate, and the second substrate includes a second alignment layer on a second base substrate. Both the first alignment layer and the second alignment layer are in direct contact with the liquid crystal layer. The first alignment layer and the second alignment layer are configured in such a way that allowing the initial alignment of the liquid crystal to be vertical alignment. On one hand, because the first alignment layer and the second alignment layer do not need to be combined with polymerizable monomers, the alignment process is simplified compared with the aforementioned PSVA technology. On the other hand, because the initial alignment of the liquid crystal is vertical alignment and the alignment direction of the liquid crystal is not affected by the deviation between an alignment direction of the first alignment layer and an alignment direction of the second alignment layer, it is possible to alleviate the light leakage in the dark state by using a simpler alignment process, thereby increasing the contrast.

For example, the first alignment layer and the second alignment layer are made from a polyimide material or the like. For example, the polyimide material are mainly classified into two categories. The polyimide material of one category has a structure that allows the liquid crystal to be in horizontal alignment, and the polyimide material of the other category has a structure that allows the liquid crystal to be in vertical alignment. In the embodiments of the present disclosure, the polyimide material or the like that allows the liquid crystal to be in vertical alignment is selected.

For example, the first alignment layer and the second alignment layer are alignment layers that are subjected to an alignment treatment, such as rubbing alignment or photo alignment. The alignment layer after being subjected to the alignment treatment enables the liquid crystal molecules in direct contact with the alignment layer to have a non-zero pre-tilt angle, which is beneficial to increase the uniformity of the deflection of the liquid crystals under non-zero electric field so as to reduce defects.

For example, the rubbing alignment includes: coating a pulp for forming the alignment layer on a corresponding base substrate and performing a pre-curing process to form a layer (such as a polyimide layer); and then performing post-baking process to completely cure the layer; next, rubbing a surface of the cured layer along a specified direction to form grooves on the surface of the cured layer.

For example, the photo alignment includes: coating a pulp for forming the alignment layer on a corresponding base substrate and performing a pre-curing process to form a layer (such as a polyimide layer); and then irradiating the layer under light, for example under polarized ultraviolet light so that the layer is aligned; next, performing post-baking process to completely cure the layer.

Because the rubbing alignment does not require the layer to be irradiated under the polarized ultraviolet light, the rubbing alignment is preferred so as to simplify the process.

FIGS. 2A to 3G are schematic diagrams of liquid crystal panels provided by the embodiments of the present disclosure. As shown in FIGS. 2A to 3G, the liquid crystal panel provided by the embodiment of the present disclosure includes a first substrate S1, a second substrate S2, and a liquid crystal layer LC. The first substrate S1 includes a first base substrate BS1, and a pixel electrode PE, a common electrode CE, and a first alignment layer AL1 located on the first base substrate BS1. The pixel electrode PE and the common electrode CE are located between the first base substrate BS1 and the first alignment layer AL1 in a direction perpendicular to the first base substrate BS1 (the direction is perpendicular to a surface of the first base substrate BS1 facing toward the liquid crystal layer LC). The second substrate S2 is opposed to the first substrate S1. The second substrate S2 includes a second base substrate BS2 and a second alignment layer AL2 located on the second base substrate BS2. The liquid crystal layer LC is located between the first substrate S1 and the second substrate S2 in the direction perpendicular to the first base substrate BS1. The first alignment layer AL1 and the second alignment layer AL2 are in a vertical alignment mode.

For example, the liquid crystal in the liquid crystal layer LC is a negative liquid crystal, that is, the dielectric anisotropy coefficient of the liquid crystal satisfies $\Delta\varepsilon<0$, which is beneficial to increase the light efficiency. In order to reduce the driving voltage, the negative liquid crystal having larger absolute value of the dielectric anisotropy coefficient is selected. For example, the negative liquid crystal having $\Delta\varepsilon$ of less than or equal to $-5.8$ is selected. For example, the negative liquid crystal having $\Delta\varepsilon$ of $-6.5$ or $-7.8$ is selected. In order to reduce the gap between the first substrate S1 and the second substrate S2 to reduce the thickness of the liquid crystal panel, the liquid crystal having larger birefringence coefficient $\Delta n$ is selected. For example, $\Delta n$ is greater than or equal to 0.114. For example, $\Delta n$ is 0.13. In addition, in order to speed up the response speed, the viscosity of the liquid crystal is set as small as possible.

In some embodiments, the first substrate S1 further includes a first polarizer POL1 located on a side of the first base substrate BS1 facing away from the liquid crystal layer LC. The second substrate S2 further includes a second polarizer POL2 located on a side of the second base substrate BS2 facing away from the liquid crystal layer LC. An optical-axis direction of the first polarizer POL1 and an optical-axis direction of the second polarizer POL2 are approximately perpendicular to each other.

It should be noted that a designed value of an angle between the optical-axis direction of the first polarizer POL1 and the optical-axis direction of the second polarizer POL2 is 90°. However, due to the manufacturing process or other reasons, the designed value of the angle between the optical-axis direction of the first polarizer POL1 and the optical-axis direction of the second polarizer POL2 may be slightly deviated from 90°, that is, the optical-axis direction of the first polarizer POL1 and the optical-axis direction of the second polarizer POL2 are approximately perpendicular to each other, and the deviation between the designed value and the actual value of the angle between the optical-axis directions is within tolerated error range.

In some embodiments, for example, as shown in FIGS. 2A to 3G, the second substrate S2 includes a combined structure CFBM of a color filter layer and a black matrix. For example, in the combined structure, the color filter layer includes a plurality of filter patterns (for example, including a red filter pattern, a green filter pattern, and a blue filter pattern) which are spaced from each other, and a black matrix is located in a gap between the filter patterns.

In some embodiments, for example, as shown in FIGS. 2A to 3G, the display panel further includes a cover plate CG having a protection function. For example, the cover plate CG is connected to the second substrate S2 through the second polarizer POL2.

Figure 2A:
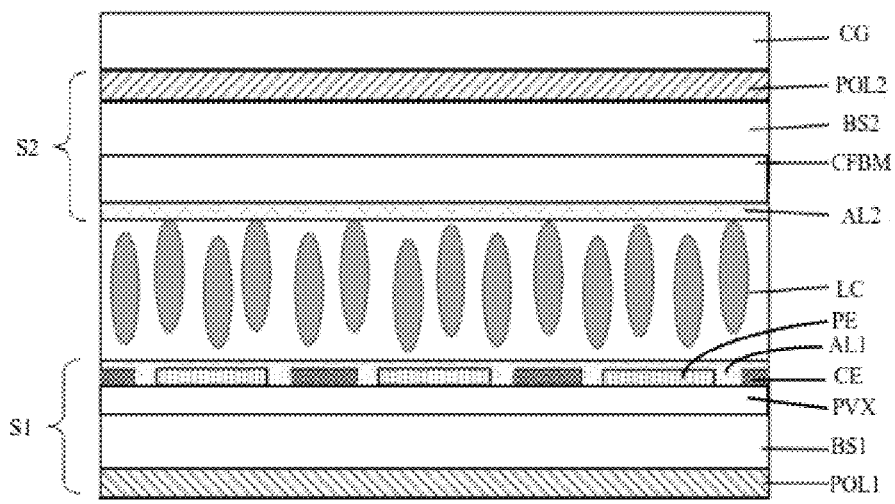
FIGS. 2A to 3G are schematic diagrams of liquid crystal panels provided by embodiments of the present disclosure.
Figure 2B:
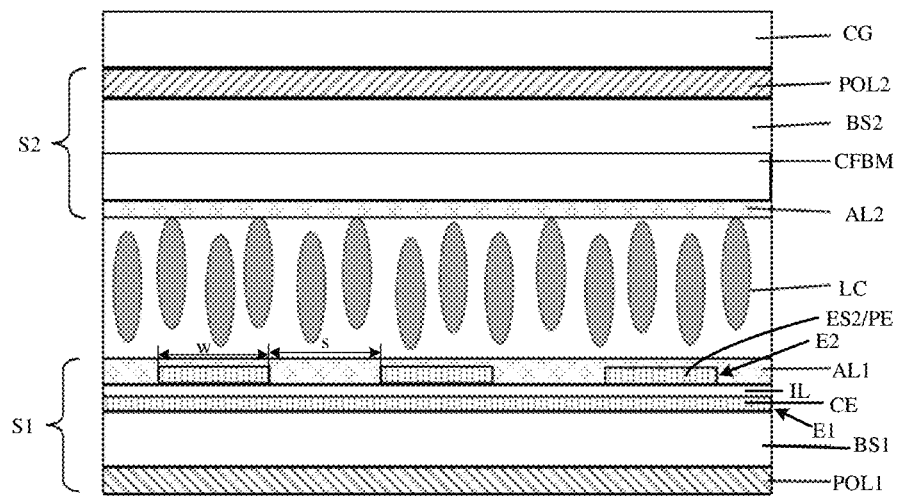
Figure 2C:
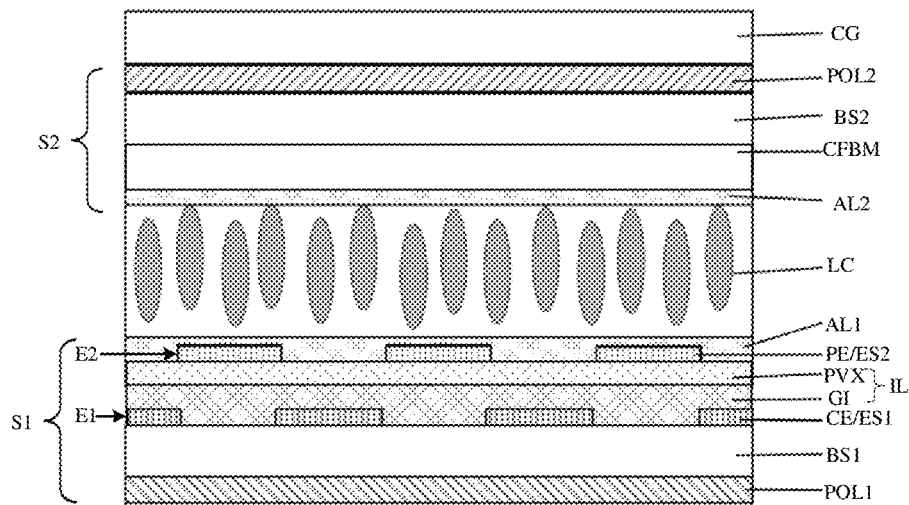
Figure 2D:
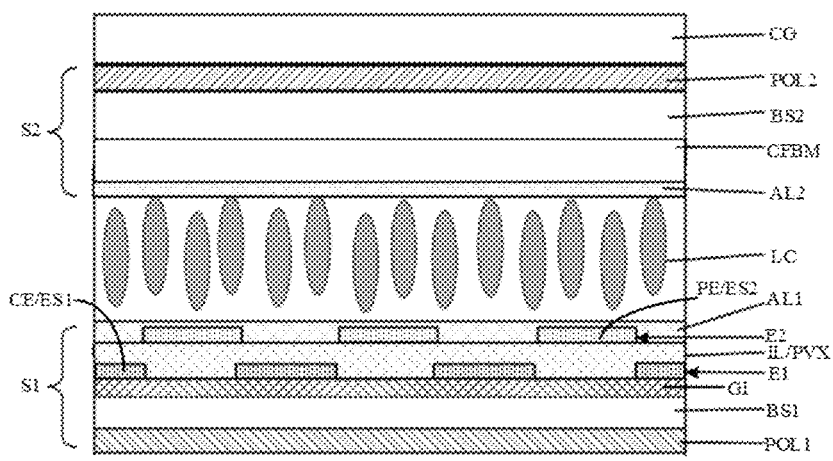

In some embodiments, the first substrate S1 in the liquid crystal panel further includes a switch element electrically connected to the pixel electrode PE, and a passivation insulation layer PVX located on a side of the switch element facing away from the first base substrate BS1 (as shown in FIG. 2C and FIG. 2D). For example, the switch element is a thin film transistor or other types of switch. For example, the thin film transistor includes a gate electrode, an active layer, and a source electrode and a drain electrode electrically connected to the active layer. The gate electrode and the active layer are separated from each other by a gate insulation layer (see GI in FIG. 2C and FIG. 2D). For example, the active layer is made from semiconductor material, such as amorphous silicon, metal oxide, or the like.

For example, the liquid crystal panel is a light-transmissive liquid crystal panel. In this situation, the material of the pixel electrode PE and the common electrode CE of the first substrate S1 is transparent electrically-conductive material. For example, the transparent electrically-conductive material is transparent electrically-conductive oxide, such as indium tin oxide, indium gallium zinc oxide, indium zinc oxide, or the like.

Figure 3A:
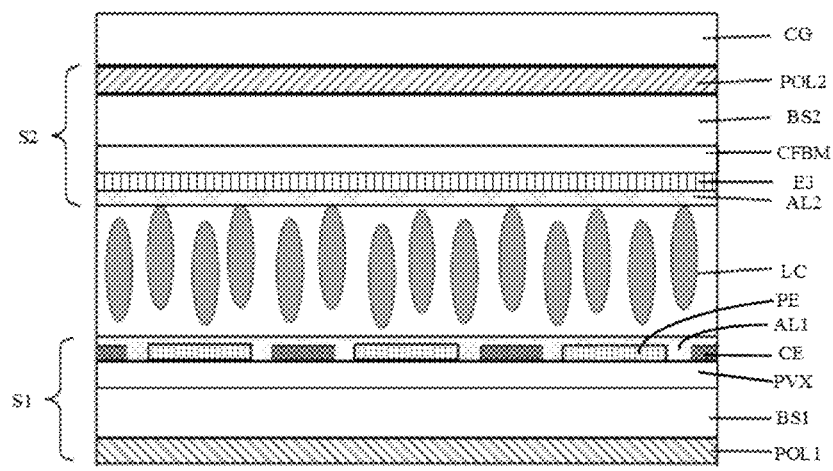

In some embodiments, the pixel electrode PE and the common electrode CE are located in the same layer. For example, as shown in FIGS. 2A and 3A, the pixel electrode PE and the common electrode CE are arranged side by side on the surface of the same layer (for example, the passivation insulation layer PVX) and are in direct contact with the surface of the same layer. For example, the pixel electrode PE has a plurality of pixel electrode strips provided at intervals, the common electrode CE has a plurality of common electrode strips provided at intervals, and the pixel electrode strips and the common electrode strips are alternately arranged.

In other embodiments, the pixel electrode PE and the common electrode CE are located in different layers. For example, as shown in FIGS. 2B-2D and FIGS. 3B-3G, the first substrate S1 includes a first electrode layer E1 and a second electrode layer E2 that are sequentially located on the side of the first base substrate BS1 facing toward the liquid crystal layer LC. The first electrode layer E1 is located between the first base substrate BS1 and the second electrode layer E2 in the direction perpendicular to the first base substrate BS1. The second electrode layer E2 includes a plurality of second electrode strips ES2 provided at intervals, and the plurality of second electrode strips ES2 are electrically connected to one another. One of the pixel electrode PE and the common electrode CE is located in the second electrode layer E2 and includes the second electrode strips ES2; the other of the pixel electrode PE and the common electrode CE is located in the first electrode layer E1 and includes a part that extends beyond the second electrode strips ES2 in a direction parallel to the first base substrate BS1, so that the electric field is formed between the pixel electrode PE and the common electrode CE. In other words, the liquid crystal panels shown in FIGS. 2B-2D and FIGS. 3B-3G adopts Advanced Super Dimension Switch (ADS) technology, so that the liquid crystal panels have high resolution, high light-transmittance, low power consumption, wide viewing angle, high aperture ratio, low chromatic aberration, and other advantages of ADS technology.

It should be noted that in the embodiments shown in FIGS. 2B-2D and FIGS. 3B-3G, the case that the first electrode layer E1 includes the common electrode CE and the second electrode layer E2 includes the pixel electrode PE having the plurality of second electrode strips ES2 is taken as an example. In other embodiments, for example, the first electrode layer E1 includes the pixel electrode PE and the second electrode layer E2 includes the common electrode CE having the plurality of second electrode strips ES2.

In some embodiments, on the basis that the second electrode layer E2 includes the pixel electrode PE (or the common electrode CE) having the plurality of second electrode strips ES2, the first electrode layer E1 for example includes the common electrode CE having a plate-shaped structure (or the first electrode layer E1 includes the pixel electrode PE having the plate-shaped structure; herein, the plate-shaped structure does not have an opening penetrating through the plate-shaped structure). That is, one of the pixel electrode PE and the common electrode CE has the plurality of second electrode strips and the other has the plate-shaped structure. In this situation, as shown in FIGS. 2B, 3B, 3D-3E, and 3G, the first electrode layer E1 includes the plate-shaped structure which is continuous, and orthographic projections of the second electrode strips ES2 on the first base substrate BS1 is within an orthographic projection of the plate-shaped structure on the first base substrate BS1. One of the pixel electrode PE and the common electrode CE includes the plurality of second electrode strips ES2 and the other has the plate-shaped structure, which is beneficial to increase the storage capacitance.

In other embodiments, on the basis that the second electrode layer E2 includes the pixel electrode PE (or the common electrode CE) having the plurality of second electrode strips ES2, the first electrode layer E1 for example includes the common electrode CE having a plurality of first electrode strips (or the pixel electrode PE having a plurality of first electrode strips). That is, each of the pixel electrode PE and the common electrode CE has a plurality of electrode strips. For example, as shown in FIGS. 2C-2D, 3C, and 3F, the first electrode layer E1 includes the plurality of first electrode strips ES1 provided at intervals (the plurality of first electrode strips ES1 are electrically connected to one another), and the second electrode layer E2 includes the plurality of second electrode strips ES2 provided at intervals. The common electrode CE is located in the first electrode layer E1 and includes the first electrode strips ES1; and the pixel electrode PE is located in the second electrode layer E2 and includes the second electrode strips ES2. In other embodiments, the pixel electrode PE is for example located in the first electrode layer E1 and includes the first electrode strips ES1, and the common electrode CE is located in the second electrode layer E2 and includes the second electrode strips ES2.

Figure 3B:
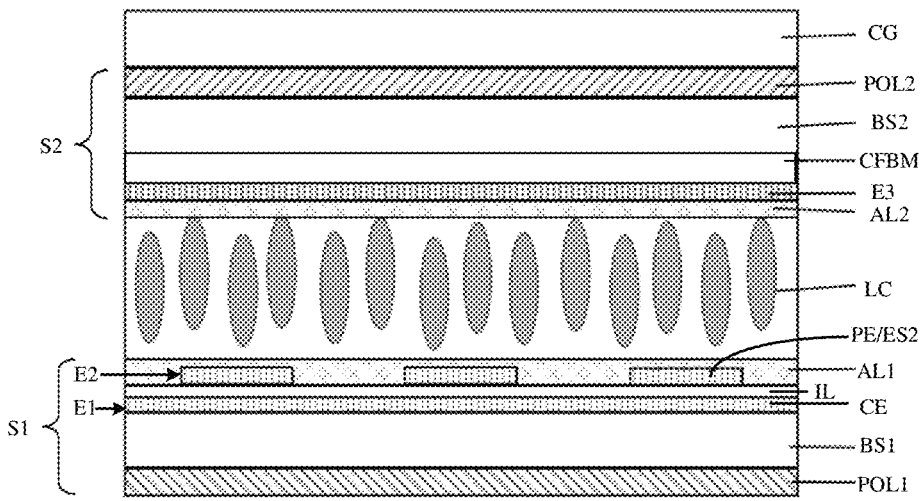
Figure 3C:
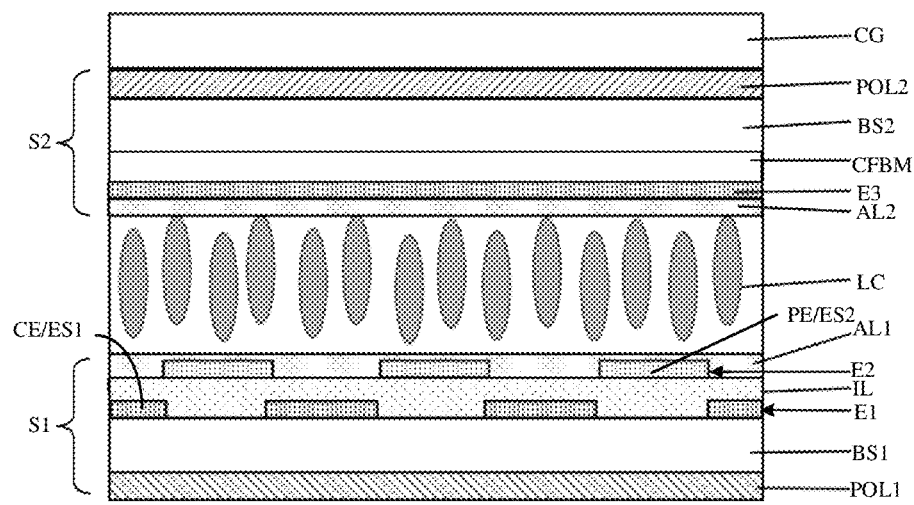

In some embodiments, as shown in FIGS. 2C-2D, and 3C, an orthographic projection of the first electrode strip ES1 on the first base substrate BS1 partially overlaps an orthographic projection of the second electrode strip ES2 on the first base substrate BS1. In other embodiments, as shown in FIG. 3F, the orthographic projection of the first electrode strip ES1 on the first base substrate BS1 doesn't overlap the orthographic projection of the second electrode strip ES2 on the first base substrate BS1. That is, the orthographic projection of the first electrode strip ES1 on the first base substrate BS1 is outside the orthographic projection of the second electrode strip ES2 on the first base substrate BS1.

In a case where one of the pixel electrode PE and the common electrode CE is located in the first electrode layer E1 and the other is located in the second electrode layer E2, for example, as shown in FIGS. 2B-2D and 3B-3G, the first substrate S1 further includes an insulation layer IL located between the first electrode layer E1 and the second electrode layer E2 in the direction perpendicular to the first base substrate BS1. That is, the first electrode layer E1 is located on a side of the insulation layer IL facing toward the first base substrate BS1, and the second electrode layer E2 is located on a side of the insulation layer IL facing away from the first base substrate BS1.

In some embodiments, the insulation layer IL for separating the first electrode layer E1 from the second electrode layer E2 has a single-layer structure, as shown in FIGS. 2B, 2D, and 3B-3F. For example, the insulation layer IL having the single-layer structure is the passivation insulation layer PVX. In other embodiments, the insulation layer IL has a multi-layer structure, as shown in FIG. 2C. For example, the insulation layer IL having the multi-layer structure includes the gate insulation layer GI and the passivation insulation layer PVX on a side of the gate insulation layer GI facing away from the first base substrate BS1. In other embodiments, the insulation layer IL includes other insulation films, which will not be repeated here.

Figure 4:
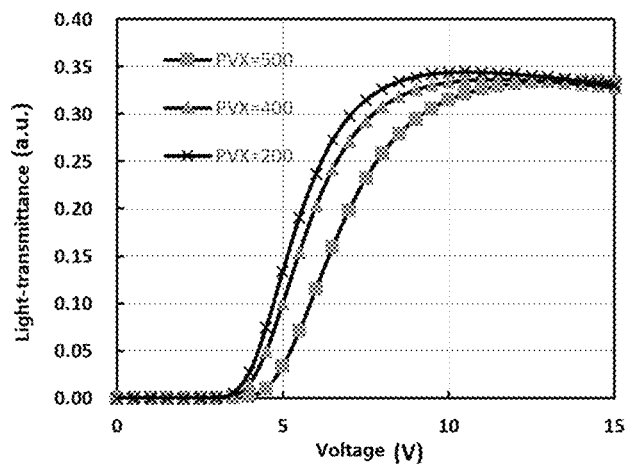
FIG. 4 is a comparison diagram of V-T curves in the case that an insulation layer has different thicknesses according to the embodiments of the present disclosure.

For example, the insulation layer IL for separating the first electrode layer E1 from the second electrode layer E2 has a thickness of 100 nm~2000 nm; for example, 100 nm~700 nm; for another example, 100 nm~400 nm. For example, the thickness of the insulation layer IL is the minimum value within the process permitting range; for example, 100 nm, 150 nm, 200 nm, 250 nm or 300 nm. FIG. 4 is a comparison diagram of V-T curves in the case that the insulation layer has different thicknesses according to the embodiments of the present disclosure. The voltage in FIG. 4 represents voltage of the pixel electrode in the case that the voltage of the common electrode is 0V. The insulation layer IL which has the single-layer structure consisting of the passivating insulation layer PVX is taken as an example, and the V-T curves (driving voltage VS light-transmittance curves) in the case that the thickness of PVX is 200 nm, 400 nm, and 500 nm are shown in FIG. 4. It can be seen from FIG. 4 that the smaller the thickness of the PVX is, the greater the light-transmittance under the same driving voltage is. Moreover, in a case where the light-transmittance is the same, the smaller the thickness of the PVX is, the lower the driving voltage is. Hence, in the embodiments of the present disclosure, the thinner insulation layer IL is beneficial to reduce the driving voltage of the liquid crystal panel and increase the light-transmittance of the liquid crystal panel. For example, the passivation insulation layer PVX is an inorganic insulation layer, which includes, for example, one or a combination of inorganic thin films such as a silicon dioxide film, a silicon nitride film, and a silicon oxynitride film.

Figure 5:
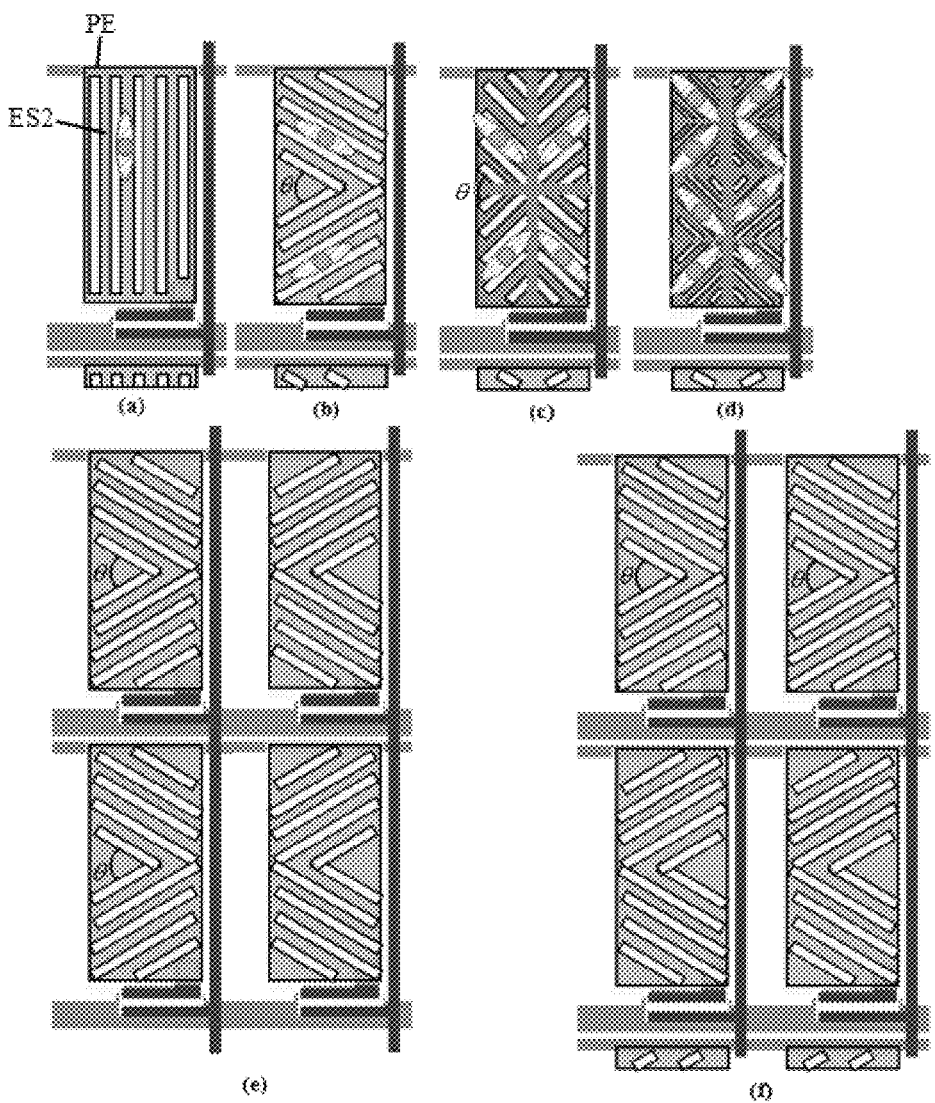
FIG. 5 is a schematic diagram of a domain structure in the liquid crystal panel provided by the embodiments of the present disclosure.

For example, in a case where the second electrode layer E2 includes the pixel electrode PE, the pixel electrode PE includes the plurality of pixel electrode strips (for example the second electrode strips ES2), the plurality of pixel electrode strips are arranged to have a structure of single domain, double-domain, four-domain, eight-domain, etc. The "domain" here refers to the total number of different extension directions of the pixel electrode strips within a same sub-pixel of the plurality of sub-pixels in the liquid crystal panel. For example, as shown in (a) of FIG. 5, in the same sub-pixel, all the pixel electrode strips of the pixel electrode PE extend in a same direction, that is, the pixel electrode PE has the single domain structure. For example, in the same sub-pixel and in a case where the pixel electrode PE includes multiple domains, an angle θ between the pixel electrode strips respectively in two adjacent domains is 10°~14° or 90°, as shown in (b)~(d) of FIG. 5. For example, different sub-pixels have various domain structures. For example, the four-domain structure is formed by two sub-pixels. For example, as shown in (e) and (f) of FIG. 5, the pixel electrode in the same sub-pixel has two domains (for example, for these two domains, the extension direction of the pixel electrode strip in one domain is symmetrical with the extension direction of the pixel electrode strip in the other domain). Moreover, for two sub-pixels adjacent to each other in a row direction, the extension direction of the pixel electrode strip in the domain of one sub-pixel is symmetrical with the extension direction of the pixel electrode strip in the domain of the other sub-pixel (see (e) of FIG. 5). Alternatively, for two sub-pixels adjacent to each other in a column direction, the extension direction of the pixel electrode strip in the domain of one sub-pixel is symmetrical with the extension direction of the pixel electrode strip in the domain of the other sub-pixel (see (f) of FIG. 5). In different domain structures, the initial state of the liquid crystal remains unchanged, and the liquid crystal molecules (indicated by the elliptical structure in the drawings) are arranged perpendicular to the first substrate and the second substrate. In the case that the driving voltage is applied, the liquid crystal deflects to the direction parallel to the first substrate and the second substrate and is mainly arranged along the extension direction of the pixel electrode strip in a horizontal plane. In a case where there are multiple domains in the same sub-pixel, a transition region is provided between the domains, but the arrangement along the extension direction of the pixel electrodes strip is still maintained in the same domain.

For the liquid crystal panel shown in FIGS. 2A to 2D, under zero electric field, the initial alignment of the liquid crystal is substantially perpendicular to the substrates (the first substrate S1 and the second substrate S2). Under the action of the electric field, the arrangement of the liquid crystal molecules is as follows: in a region of the liquid crystal layer close to one of the substrates, the state of the liquid crystal perpendicular to the substrate is difficult to change due to strong anchoring effect of the alignment layer of the substrate. In this situation, the electric field is not strong enough to deflect the liquid crystal. However, the size of the region where the liquid crystal cannot be deflected, due to the strong anchoring effect of the alignment layer, is relatively smaller, so its influence is ignored. In a middle action region of the liquid crystal layer, the electric field points from the pixel electrode to the common electrode; in this situation, the negative liquid crystal deflects under the action of the electric field and deflects to the direction parallel to the substrates.

In the structures shown in FIGS. 3A to 3G, the second substrate S2 further includes a first enhancement electrode E3 located on the side of the second substrate BS2 facing toward the liquid crystal layer LC, and the first enhancement electrode E3 is located between the second substrate BS2 and the second alignment layer AL2 in the direction perpendicular to the first substrate BS1. The first enhancement electrode E3 is configured in such a way that a non-zero voltage difference is generated between the first enhancement electrode E3 and at least one of the pixel electrode PE and the common electrode CE during operation of the liquid crystal panel. That is, a vertical electric field is formed between the at least one of the pixel electrode PE and the common electrode CE and the first enhancement electrode E3 during operation of the liquid crystal panel. For example, during operation of the liquid crystal panel, the non-zero voltage difference is generated between the first enhancement electrode E3 and only the pixel electrode PE; alternatively, the non-zero voltage difference is generated between the first enhancement electrode E3 and only the common electrode CE; alternatively, the non-zero voltage difference is generated between the first enhancement electrode E3 and each of the pixel electrode PE and the common electrode CE.

In the structures shown in FIGS. 3A to 3G, on the basis that the horizontal electric field is generated between the pixel electrode PE and the common electrode CE, the vertical electric field is further generated between at least one of the pixel electrode PE and the common electrode CE and the first enhancement electrode E3. By introducing the vertical electric field in the horizontal electric field mode, the horizontal electric field is adjusted, and it is possible to reduce the driving voltage while retaining the characteristics of the horizontal electric field mode, thereby increasing the light-transmittance and contrast.

Figure 6:
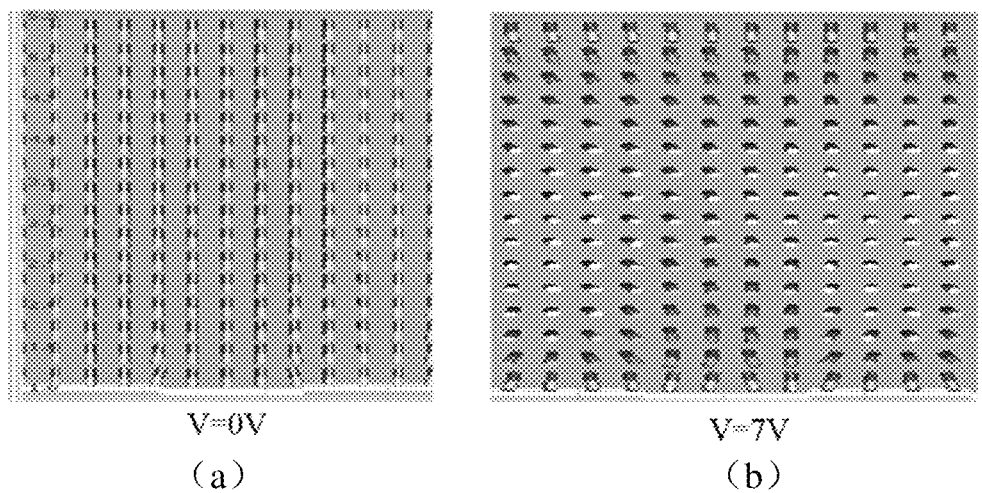
FIG. 6 is a schematic diagram of director distribution of the liquid crystal panel provided by the embodiments of the present disclosure in the case that a first enhancement electrode is included and under different electric fields.

FIG. 6 is a schematic diagram of director distribution of the liquid crystal panel provided by the embodiments of the present disclosure in the case that the first enhancement electrode is included and under different electric fields. As shown in (a) of FIG. 6, in the case that the electric field is zero (V=0), the liquid crystal molecules (indicated by the dot-like structure in the drawing) are arranged perpendicular to the substrates, and the pre-tilt angle is of approximately 87°~93°. Under the action of the electric field, in a case where the pixel electrode is located on the side of the common electrode facing toward the liquid crystal layer, the arrangement of liquid crystal molecules is shown in FIG. 6(*b*). In (b) of FIG. 6, in the middle action region of the liquid crystal layer, the horizontal electric field is generated between the pixel electrode and the common electrode of the first substrate, the vertical electric field is generated between the first enhancement electrode and the pixel electrode, and the vertical electric field is directed from the pixel electrode of the first substrate to the first enhancement electrode of the second substrate. In this situation, the negative liquid crystal is deflected under the action of the vertical electric field, and is deflected to be aligned in the direction parallel to the substrates. It can be seen that in the liquid crystal panel including the first enhancement electrode, due to the introduction of the vertical electric field, some of the liquid crystal molecules that did not rotate to the desired state under the original horizontal electric field are also deflected, which improves the bright-state light-transmittance to some extent, thereby increasing the light efficiency of the liquid crystal.

In some embodiments, as shown in FIGS. 3A to 3C, the first enhancement electrode E3 includes a continuous plate-shaped structure. In this situation, the orthographic projection of the plurality of second electrode strips ES2 in the second electrode layer E2 on the first base substrate BS1 is located within an orthographic projection of the first enhancement electrode E3 having the plate-shaped structure on the first base substrate BS1.

In other embodiments, the first enhancement electrode E3 includes a plurality of electrode strips. For example, as shown in FIGS. 3D to 3G, the first enhancement electrode E3 includes the plurality of third electrode strips ES3 provided at intervals and electrically connected to one another. By providing the first enhancement electrode E3 to include the plurality of third electrode strips ES3, it is beneficial to increase the light-transmittance.

Figure 3D:
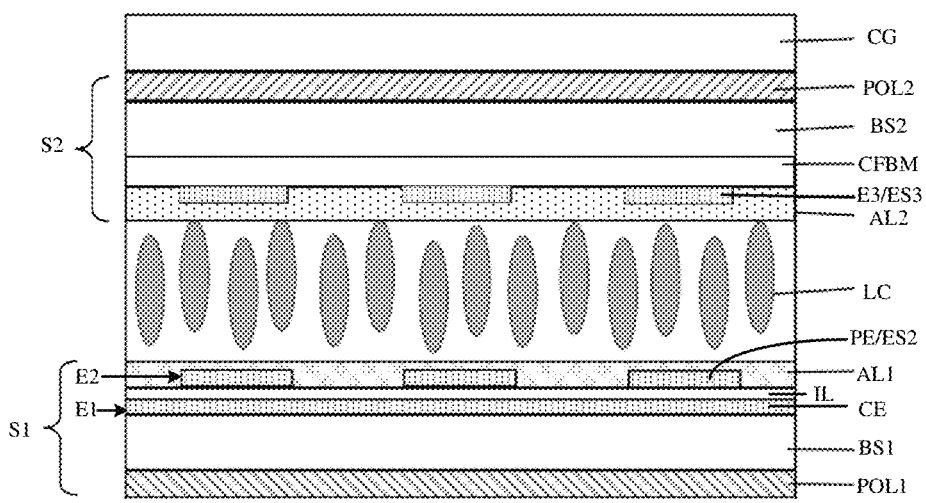

For example, as shown in FIG. 3D, orthographic projections of the plurality of third electrode strips ES3 in the first enhancement electrode E3 on the first base substrate BS1 completely coincide with orthographic projections of the plurality of second electrode strips ES2 on the first base substrate BS1. That is, each of the third electrode strip ES3 does not have a portion extending beyond the second electrode strip ES2, and each of the second electrode strip ES2 does not have a portion extending beyond the third electrode strip ES3.

Figure 3E:
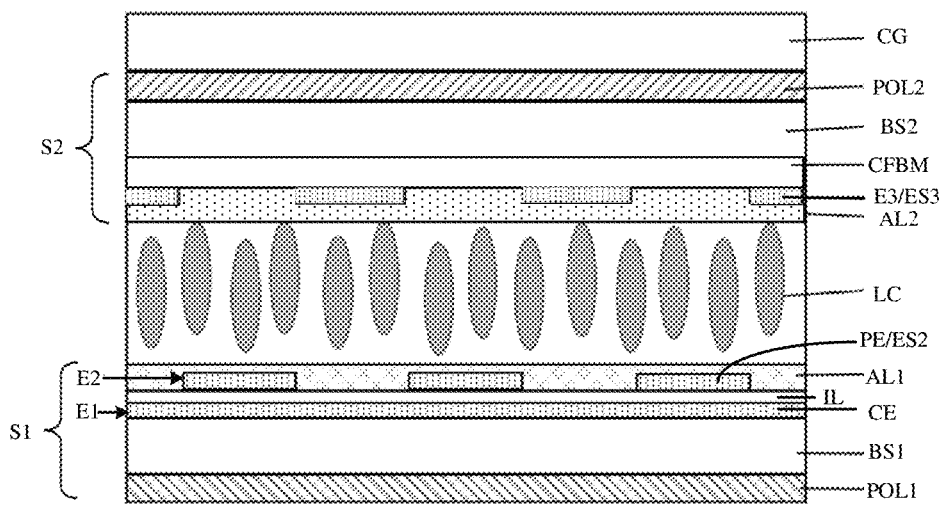
Figure 3F:
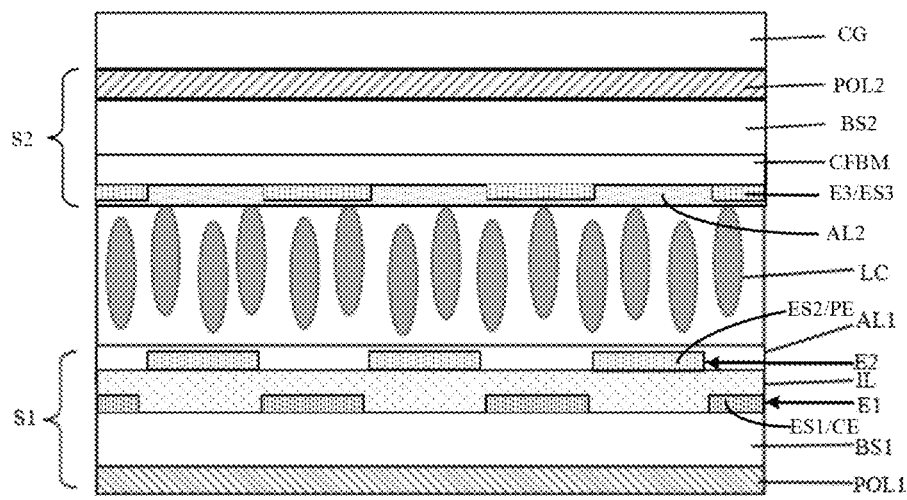
Figure 3G:
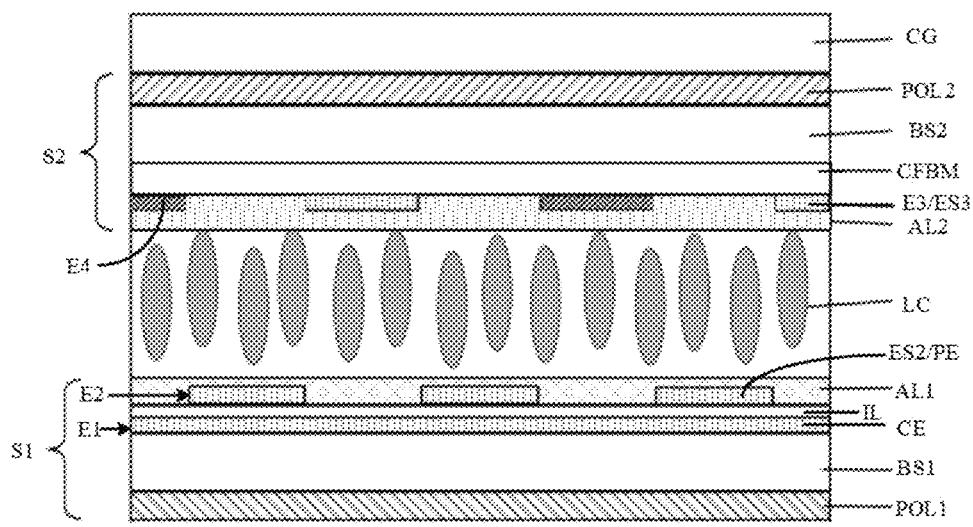

For example, as shown in FIGS. 3E to 3G, the orthographic projections of the plurality of third electrode strips ES3 in the first enhancement electrode E3 on the first base substrate BS1 is staggered with the orthographic projections of the plurality of second electrode strips ES2 on the first base substrate BS1. That is, the orthographic projection of the third electrode strip ES3 on the first base substrate BS1 only partially overlap (i.e., the orthographic projection includes an overlapping part and a non-overlapping part) or doesn't overlap the orthographic projection of the second electrode strip ES2 on the first base substrate BS1. By staggering the third electrode strip ES3 with the second electrode strip ES2, it is beneficial to simultaneously adjust the electric field directly above the second electrode strip ES2 and the electric field between the adjacent second electrode strips ES2, thereby facilitating the deflection of liquid crystal molecules and further improving the bright-state light-transmittance.

Figure 7:
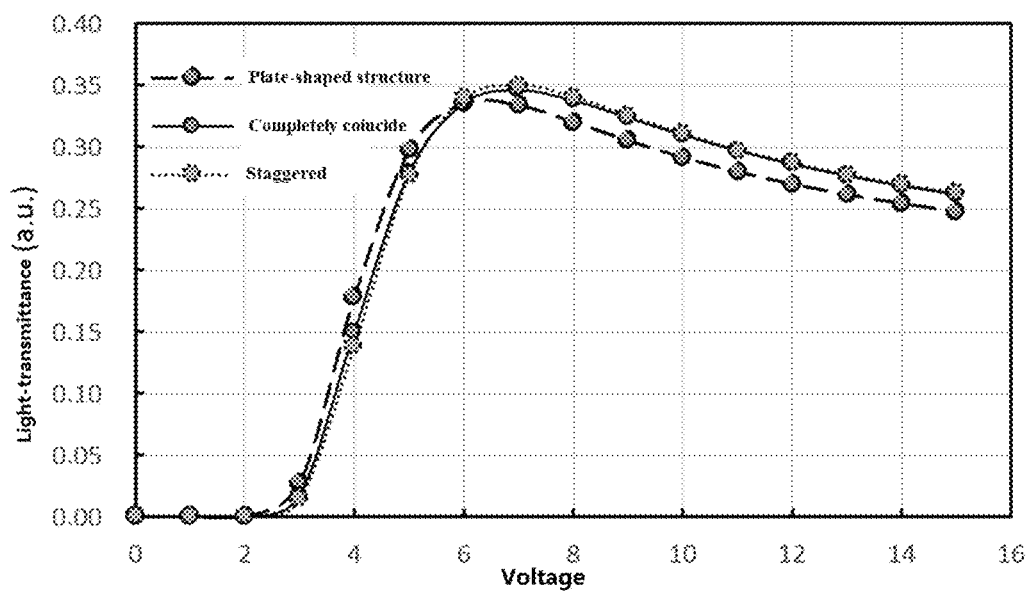
FIG. 7 is a comparison diagram of V-T curves in the case that the first enhancement electrode in the liquid crystal panel provided by the embodiments of the present disclosure adopts different structures.

FIG. 7 is a comparison diagram of V-T curves in the case that the first enhancement electrode in the liquid crystal panel provided by the embodiments of the present disclosure adopts different structures. Herein, the "voltage" is the voltage of the pixel electrode in the case that the common electrode is 0V. As shown in FIG. 7, "the plate-shaped structure" means that the first enhancement electrode is of the plate-shaped structure; "completely overlap" means that the orthographic projection of the third electrode strip ES3 in the first enhancement electrode E3 completely coincides with the orthographic projection of the second electrode strip ES2; and "staggered" means that the orthographic projection of the third electrode strip ES3 in the first enhancement electrode E3 is staggered with the orthographic projection of the second electrode strip ES2. It can be seen from FIG. 7 that, for the maximum light-transmittance of the liquid crystal panel (that is, the bright state light-transmittance L255), the L255 in a case where the first enhanced electrode E3 includes the plurality of third electrode strips ES3 (that is, in the case that the third electrode strip completely coincides with or staggers with the second electrode strip) is larger than the L255 in a case where the first enhanced electrode E3 has the plate-shaped structure. Moreover, the maximum light-transmittance in a case where the orthographic projection of the third electrode strip ES3 is staggered with the orthographic projection of the second electrode strip ES2 is larger than the maximum light-transmittance in a case where the orthographic projection of the third electrode strip ES3 completely coincides with the orthographic projection of the second electrode strip ES2.

For example, the first enhancement electrode E3 is configured to be applied with a constant signal (that is, the magnitude and electrical property of the signal remain unchanged) or a varying signal (that is, at least one of the magnitude and electrical property of the signal changes with time) during operation.

In some embodiments, the electrode of the second electrode layer E2 and the first enhancement electrode E3 are applied with the same signal (for example, the same changing signal or the same constant signal) during operation. In this situation, the first enhancement electrode E3 and the electrode of the first electrode layer E1 are applied with different signals during operation, so that the vertical electric field is generated between the first enhancement electrode E3 and the electrode of the first electrode layer E1.

Because the second electrode layer E2 is closer to the first enhancement electrode E3 than the first electrode layer E1, in other embodiments, in order to enhance the vertical electric field, the electrode of the second electrode layer E2 and the first enhancement electrode E3 are applied with different signals during operation. For example, one of the first enhancement electrode E3 and the electrode of the second electrode layer E2 is applied with the constant signal, and the other is applied with the varying signal; alternatively, the first enhancement electrode E3 and the electrode of the second electrode layer E2 are applied with different constant signals; alternatively, the first enhancement electrode E3 and the electrode of the second electrode layer E2 are applied with different variable signals. In a case where the first enhancement electrode E3 and the electrode of the second electrode layer E2 are applied with different signals during operation, the first enhancement electrode E3 and the electrode of the first electrode layer E1 are applied with the same signal or different signals during operation.

For example, the first electrode layer E1 includes the common electrode CE, the second electrode layer E2 includes the pixel electrode PE, and the first enhancement electrode E3 serves as another common electrode (that is, the first enhancement electrode E3 is configured to be applied with the constant signal during operation), and the another common electrode and the common electrode CE are applied with different signals or the same signal; alternatively, the first electrode layer E1 includes the pixel electrode PE, the second electrode layer E2 includes the common electrode CE, and the first enhancement electrode E3 serves as another pixel electrode (that is, the first enhancement electrode E3 is configured to be applied with the change signal similar to the signal applied to the pixel electrode during operation), and the another pixel electrode and the pixel electrode PE are applied with different signals (for example, the different signals are opposite in positive and negative frames, such as the electrical properties are opposite at the same time) or the same signal; alternatively, the first electrode layer E1 includes the common electrode CE, the second electrode layer E2 includes the pixel electrode PE, and the first enhancement electrode E3 serves as another pixel electrode, and the another pixel electrode and the pixel electrode PE are applied with different signals; alternatively, the first electrode layer E1 includes the pixel electrode PE, the second electrode layer E2 includes the common electrode CE, the first enhancement electrode E3 serves as another common electrode, and the another common electrode and the common electrode CE are applied with different signals.

For example, in some embodiments, the first enhanced electrode E3 is configured to be applied, during operation, with the signal which is different from not only the signal applied to the pixel electrode PE during operation, but also the signal applied to the common electrode CE during operation. With this configuration, the vertical electric fields are generated between the first enhanced electrode E3 and the electrode of the second electrode layer E2 and between the first electrode layer E1 and the electrode of the first electrode layer E1, so as to obtain stronger vertical electric field.

It should be noted that the same signal in the embodiments of the present disclosure means that the signals have the same magnitude and the same electrical property at any time; and the different signals means that the signals are different in at least one of the magnitude and the electrical property of the signal during at least a part of the period of time. In some embodiments, the different signals are different constant signals or different variable signals. For example, the different constant signals are positive electrical signals but different in magnitude; alternatively, the different constant signals are negative electrical signals but different in magnitude; alternatively, the different constant signals are signals with opposite electrical property; alternatively, one of the different constant signals is 0V voltage signal, and the other is non-zero voltage signal. For example, the different variable signals are positive electrical signals at the same time, but different in magnitude; alternatively, the different variable signals are negative electrical signals at the same time, but different in magnitude; alternatively, the different variable signals are signals with opposite electrical property at the same time; alternatively, one of the different variable signals is 0V voltage signal, and at the same time, the other is non-zero voltage signal. In addition, for example, the signal applied to the pixel electrode PE is the variable signal; the signal applied to the common electrode CE is the constant signal or the variable signal which is constant in magnitude but is variable in electrical property.

In some embodiments, in order to simplify wiring arrangement, the first enhancement electrode E3 is electrically connected to the common electrode CE. In this situation, the first enhancement electrode E3 and the common electrode CE are applied with the same signal (for example, a low potential signal of the same magnitude, for example, 0V voltage). In order to obtain the stronger vertical electric field and simplify the wiring arrangement at the same time, for example, in a case where the second electrode layer E2 includes the pixel electrode PE (that is, the pixel electrode PE is closer to the first enhancement electrode E3 than the common electrode CE), the first enhancement electrode E3 is electrically connected to the common electrode CE of the first electrode layer E1.

In other embodiments, in order to simplify the wiring arrangement, the first enhancement electrode E3 is electrically connected to the pixel electrode PE. In order to obtain the stronger vertical electric field and simplify the wiring arrangement at the same time, for example, in a case where the second electrode layer E2 includes the common electrode CE (that is, the common electrode CE is closer to the first enhancement electrode E3 than the pixel electrode PE), the first enhancement electrode E3 is electrically connected to the pixel electrode PE of the first electrode layer E1.

For example, the liquid crystal panel includes a display area and a frame area between the display area and an edge of the liquid crystal panel (that is, the frame area is outside the display area). The frame area is provided with a sealant for connecting the first substrate with the second substrate. The liquid crystal panel further includes a plurality of spacers for maintaining the gap between the first substrate S1 and the second substrate S2 of the liquid crystal panel, most of the plurality of spacers are located in a non-opening area of the display area, and some of the plurality of spacers adjacent to the sealant are located in the frame area.

In some embodiments, the first enhancement electrode E3 is electrically connected with the pixel electrode PE or the common electrode CE in the frame area to avoid affecting the display effect. For example, the first enhancement electrode E3 is electrically connected with the pixel electrode PE or the common electrode CE at a position of the sealant or the spacer located in the frame area.

Figure 8A:
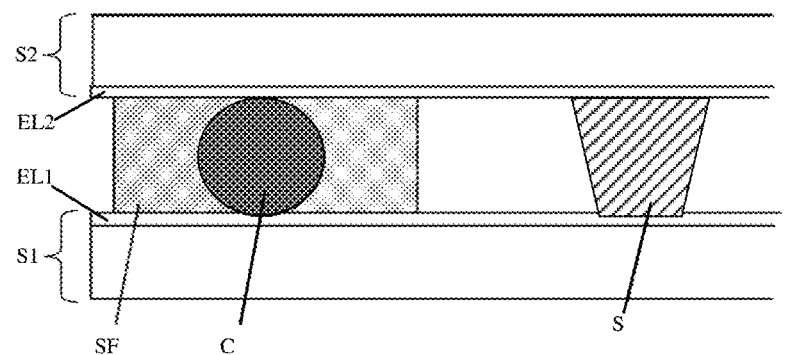
FIG. 8A is a schematic diagram showing that a first electrode signal line and a second electrode signal line are electrically connected with each other at a position of a sealant according to the embodiments of the present disclosure.

For example, as shown in FIG. 8A, the liquid crystal panel provided by some embodiments of the present disclosure further includes the sealant SF for connecting the first substrate S1 with the second substrate S2, and the sealant SF is provided with an electrically-conductive connection portion C (such as a golden ball or other types of conductors). The first enhancement electrode E3 is electrically connected with the pixel electrode PE or the common electrode CE through the electrically-conductive connection portion C. For example, as shown in FIG. 8A, the electrically-conductive connection portion C is electrically connected to a first electrode signal line EL1 of the first substrate S1, and the first electrode signal line EL1 is electrically connected to the pixel electrode or the common electrode of the first substrate S1 (not shown in FIG. 8A). The electrically-conductive connecting portion C is further electrically connected to a second electrode signal line EL2 of the second substrate S2, and the second electrode signal line EL2 is electrically connected to the first enhancement electrode (not shown in FIG. 8A). In this way, the electrical connection between the first enhancement electrode E3 and the pixel electrode PE (or the common electrode CE) is achieved through the electrically-conductive connection portion C, the first electrode signal line EL1, and the second electrode signal line EL2. On the other hand, by arranging the electrically-conductive connecting portion C between an inner edge and an outer edge of the sealant SF, the frame of the liquid crystal panel is not increased. In some embodiments, for example, the height of the electrically-conductive connection portion C in the arrangement direction of the first substrate S1 and the second substrate S2 is approximately equal to the height of the sealant SF, so that the electrically-conductive connection portion C maintains the gap between the first substrate S1 and the second substrate S2 of the liquid crystal panel.

Figure 8B:
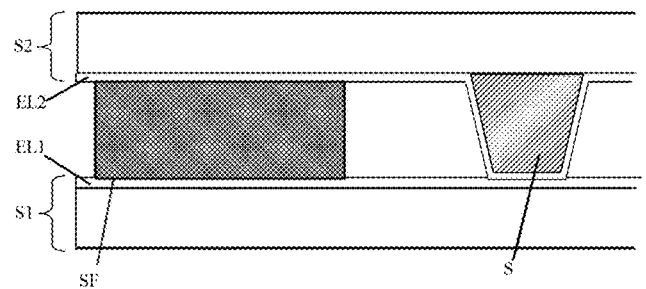
FIG. 8B is a schematic diagram showing that the first electrode signal line and the second electrode signal line are electrically connected with each other at a position of a spacer according to the embodiments of the present disclosure.

For example, as shown in FIG. 8B, the liquid crystal panel provided by other embodiments of the present disclosure further includes the plurality of spacers S between the first substrate S1 and the second substrate S2 (as an example, only one spacer S is shown in FIG. 8B). The first enhancement electrode E3 is electrically connected with the pixel electrode PE or the common electrode CE at the position of the spacer S closest to the edge of the liquid crystal panel. For example, the spacer S closest to the edge of the liquid crystal panel is the outermost spacer among the plurality of spacers in the liquid crystal panel. For example, the outermost spacer is located in the frame area. For example, as shown in FIG. 8B, the spacer S is located between the second electrode signal line EL2 and the second base substrate (not labeled in FIG. 8B) of the second substrate S2, and the second electrode signal line EL2 is electrically connected to the first enhancement electrode (not shown in FIG. 8B). The second electrode signal line EL2 is electrically connected (for example in direct contact) with the first electrode signal line EL1 at the position of the spacer S, and the first electrode signal line EL1 is electrically connected with the pixel electrode or the common electrode (not shown in FIG. 8B) of the first substrate S1. In this way, by electrically connecting the first electrode signal line EL1 and the second electrode signal line EL2 at the position of the spacer S, the electrical connection between the first enhancement electrode E3 and the pixel electrode PE (or the common electrode CE) is achieved.

In some embodiments, as shown in FIG. 3G, the second substrate S2 further includes a second enhancement electrode E4 located on the second base substrate BS2 and electrically insulated from the first enhancement electrode E3, and the first enhancement electrode E3 and the second enhancement electrode E4 are applied with different signals. For example, one of the first enhancement electrode E3 and the second enhancement electrode E4 is another pixel electrode, and the another pixel electrode and the pixel electrode PE are applied with the same signal or different signals; the other of the first enhancement electrode E3 and the second enhancement electrode E4 is another common electrode, and the another common electrode and the common electrode CE are applied with the same signal or different signals. By applying different signals to the first enhancement electrode E3 and the second enhancement electrode E4, a horizontal electric field is formed between the first enhancement electrode E3 and the second enhancement electrode E4, which further facilitates the deflection of the liquid crystal molecules and improves the light-transmittance. It should be noted that the different signals are different constant signals, or different variable signals, or respectively the constant signal and the variable signal.

For example, as shown in FIG. 3G, the second enhancement electrode E4 further includes a plurality of electrode strips electrically connected to one another; the plurality of electrode strips of the second enhancement electrode E4 and the plurality of third electrode strips ES3 of the first enhancement electrode E3 are located in the same layer and alternately arranged, which can simplify the manufacturing process of the first enhancement electrode E3 and the second enhancement electrode E4.

For example, one of the first enhancement electrode E3 and the second enhancement electrode E4 is electrically connected to the pixel electrode PE, and the other of the first enhancement electrode E3 and the second enhancement electrode E4 is electrically connected to the common electrode CE. This configuration is beneficial to simplify the wiring arrangement and signal control.

For example, in a case where the liquid crystal panel is a light-transmissive liquid crystal panel, the material of the first enhancement electrode E3 of the second substrate S2 is transparent electrically-conductive material. In a case where the second substrate S2 includes the second enhancement electrode E4, the material of the second enhancement electrode E4 is also the transparent electrically-conductive material. For example, the transparent electrically-conductive material is transparent electrically-conductive oxide, such as indium tin oxide, indium gallium zinc oxide, indium zinc oxide, or the like.

It should be noted that, in the structure shown in FIG. 3G, the pixel electrode PE and the common electrode CE are located in different layers and one of the pixel electrode PE and the common electrode CE has the plate-shaped structure. In other embodiments, in a case where the pixel electrode PE and the common electrode CE are located in different layers and both include the plurality of electrode strips, the second substrate S2 includes the first enhancement electrode E3 and the second enhancement electrode E4; alternatively, in a case where the pixel electrode PE and the common electrode CE are located in the same layer, the second substrate S2 includes the first enhancement electrode E3 and the second enhancement electrode E4.

Due to that the liquid crystal panel respectively shown in FIGS. 2B-2D does not include the enhancement electrode for forming the vertical electric field together with the pixel electrode and/or the common electrode and the liquid crystal panel respectively shown in FIGS. 3B-3G includes the enhancement electrode, the liquid crystal panel respectively shown in FIGS. 2B-2D and the liquid crystal panel respectively shown in FIGS. 3B-3G adopt different configurations in some aspects. For example, the liquid crystal panels are different in a spacing between the second electrode strips and a thickness of the liquid crystal layer. For example, in the liquid crystal panel respectively shown in FIGS. 2B-2D, in the arrangement direction of the second electrode strips ES2, the width of the second electrode strip ES2 is 1.9~3.3 microns, and the spacing between adjacent second electrode strips ES2 is 2.3 to 4.8 microns, and it is preferable that the width of the second electrode strip ES2 is smaller than the spacing between adjacent second electrode strips ES2. For example, in the liquid crystal panel respectively shown in FIGS. 3B-3G, in the arrangement direction of the second electrode strips ES2, the width of the second electrode strips ES2 is 2.0 to 3.8 microns, and the spacing between adjacent second electrode strips ES2 is 1.8 to 5.4 microns, and it is preferable that the width of the second electrode strip ES2 is greater than the spacing between adjacent second electrode strips. In a case where the second substrate S2 of the liquid crystal panel does not include the first enhancement electrode E3, providing the width w of the second electrode strip ES2 smaller than the spacing s between the adjacent second electrode strips ES2 is beneficial to form the electric field between the second electrode layer E2 and the first electrode layer E1. In a case where the second substrate S2 of the liquid crystal panel includes the first enhancement electrode E3, providing the width w of the second electrode strips ES2 greater than the spacing s between the adjacent second electrode strips ES2 is beneficial to form the vertical electric field between the first enhancement electrode E3 and at least one of the pixel electrode PE and the common electrode CE, so as to adjust the electric field formed between the second electrode layer E2 and the first electrode layer E1. In other embodiments, in a case where the width of the second electrode strip ES2 is 1.9~3.3 micrometers and the spacing between adjacent second electrode strips ES2 is 2.3~4.8 micrometers, the width of the second electrode strip ES2 is greater than or equal to the spacing between adjacent second electrode strips ES2. In a case where the width of the second electrode strip ES2 is 2.0 to 3.8 micrometers and the spacing between adjacent second electrode strips ES2 is 1.8 to 5.4 micrometers, the width of the second electrode strip ES2 is less than or equal to the spacing between adjacent second electrode strips ES2.

Figure 9A:
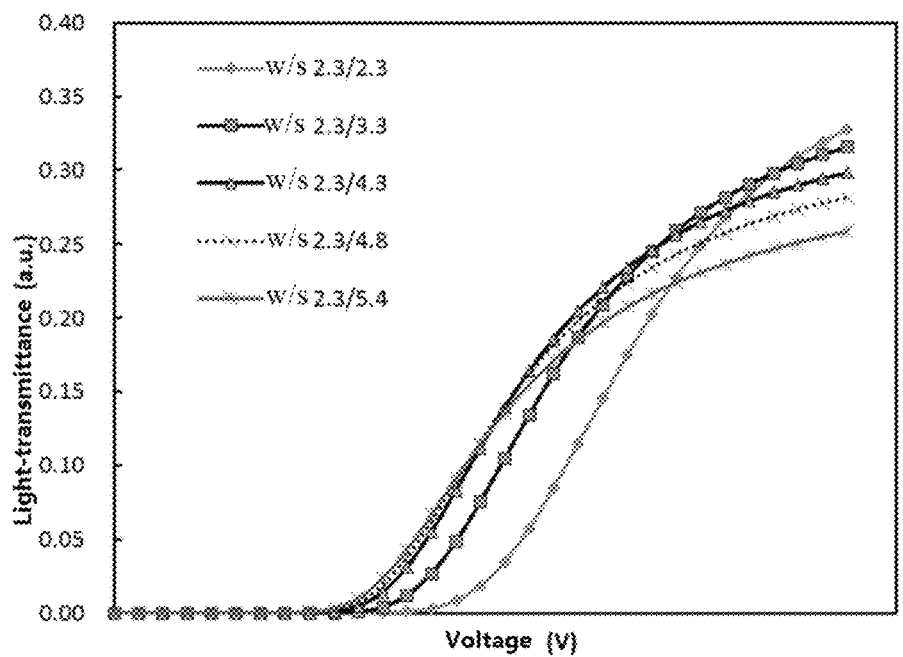
FIG. 9A is a comparison diagram of V-T curves of the liquid crystal panel shown in FIGS. 2B-2D in the case that a width of a second electrode strip is the same and a spacing between the second electrode strips is different.

FIG. 9A is a comparison diagram of V-T curves of the liquid crystal panel shown in FIGS. 2B-2D in the case that the width of the second electrode strip is the same and the spacing between the adjacent second electrode strips is different. Herein, the voltage in FIG. 9A represents the voltage of the pixel electrode in the case that the voltage of the common electrode is 0V. For example, as shown in FIG. 9A, in a case where the width w of the second electrode strip is 2.3 micrometers, the spacing s between the second electrode strips is 2.3 micrometers, 3.3 micrometers, 4.3 micrometers, and 5.4 micrometers, respectively. It can be seen from FIG. 9A that, as the spacing s between the second electrode strips increases, the driving voltage gradually decreases and the light-transmittance also gradually decreases. Considering the process, the driving voltage, the light efficiency, and other factors, w/s=2.3/4.3 is preferred. In view of this, for example, the width w of the electrode strip is approximately 2.3 micrometers, and the spacing s between the second electrode strips is approximately 4.3 micrometers.

Figure 9B:
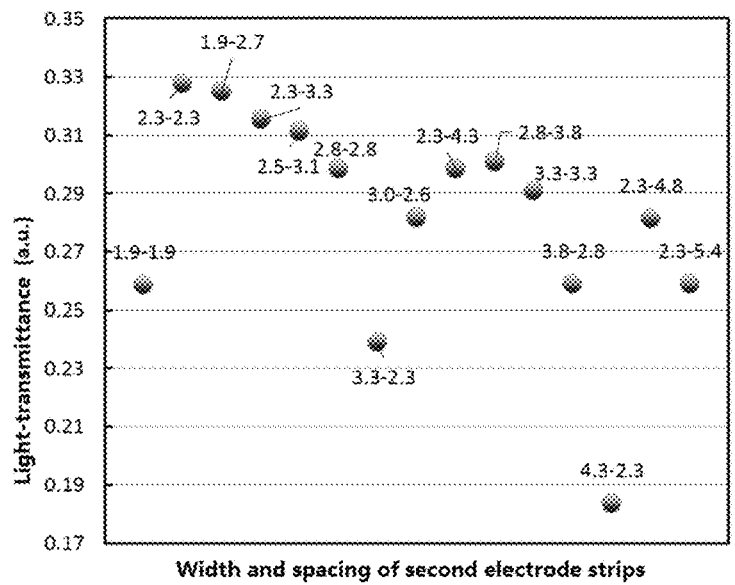
FIG. 9B shows the light-transmittance of the liquid crystal panel shown in FIGS. 2B-2D at different second electrode strip width–second electrode strip spacing.

FIG. 9B shows the light-transmittance of the liquid crystal panel shown in FIGS. 2B-2D at different second electrode strip width–second electrode strip spacing. As shown in FIG. 9B, for the liquid crystal panel shown in FIGS. 2B-2D, the width w of the second electrode strip is for example 1.9~3.3 microns, and the spacing s between the second electrode strips is for example 2.3~4.8 microns. For example, w/s is 2.3/2.3, 1.9/2.7, 2.3/3.3, 2.3/3.8, 2.3/4.8, 2.5/3.1, 2.8/2.8, 2.3/4.3, 2.8/3.8, 3.3/3.3, etc. The embodiments of the present disclosure include but are not limited to the above-mentioned examples.

Figure 9C:
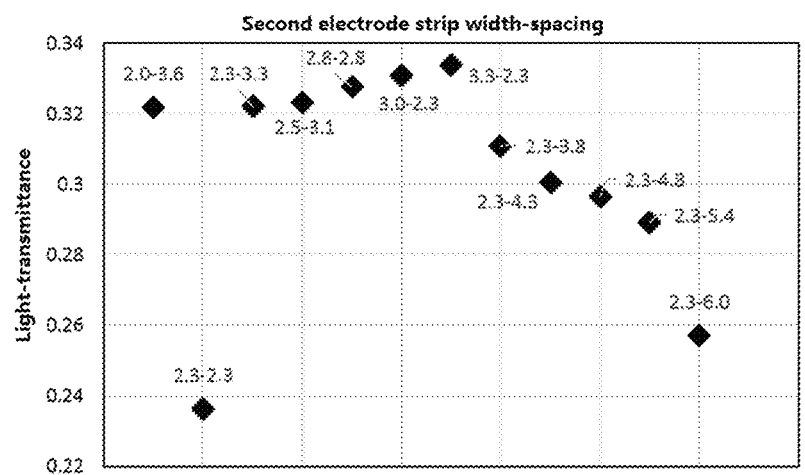
FIG. 9C shows the light-transmittance of the liquid crystal panel shown in FIGS. 3B-3G at different second electrode strip width–second electrode strip spacing.

FIG. 9C shows the light-transmittance of the liquid crystal panel shown in FIGS. 3B-3G at different second electrode strip width–second electrode strip spacing. As shown in FIG. 9C, for the liquid crystal panel shown in FIGS. 3B-3G, the width w of the second electrode strip is for example 2.0~3.8 microns, and the spacing s between the second electrode strips is for example 1.8~5.4 microns. For example, w-s is 2.0-3.6, 2.3-3.3, 2.5-3.1, 2.8-2.8, 3.0-2.3, 3.3-2.3, 3.8-1.8, 2.3-3.8, 2.3-4.3, 2.3-4.8, 2.3-5.4, etc. The embodiments of the present disclosure include but are not limited to the above-mentioned examples. It can be seen from FIG. 9C that for the same pitch (a pitch=w+s), reducing the electrode spacing is beneficial to increase the light-transmittance; moreover, as the pitch increases, the light-transmittance first increases and then decreases. Hence, for the liquid crystal panel shown in FIGS. 3B-3G, the width w of the second electrode strip is greater than or equal to 2.0, and the spacing s between the second electrode strips is as small as possible (for example, s is less than 4.0 microns, or less than 3.8 microns). Considering the practical process, it is better that the spacing between the second electrode strips s>=2.3. For example, the preferred combination is: 3.3-2.3, that is, the width w of the second electrode strip is approximately 3.3 microns, and the spacing s between the second electrode strips is approximately 2.3 microns.

For example, the thickness of the liquid crystal layer LC (that is, the gap d of the first substrate S1 and the second substrate S2 of the liquid crystal panel) is determined according to the birefringence coefficient $\Delta n$ of the liquid crystal in use. That is, the thickness d of the liquid crystal layer LC is for example calculated according to the phase difference Ret between the E light and the O light: Ret=$\Delta n*d$.

Figure 10A:
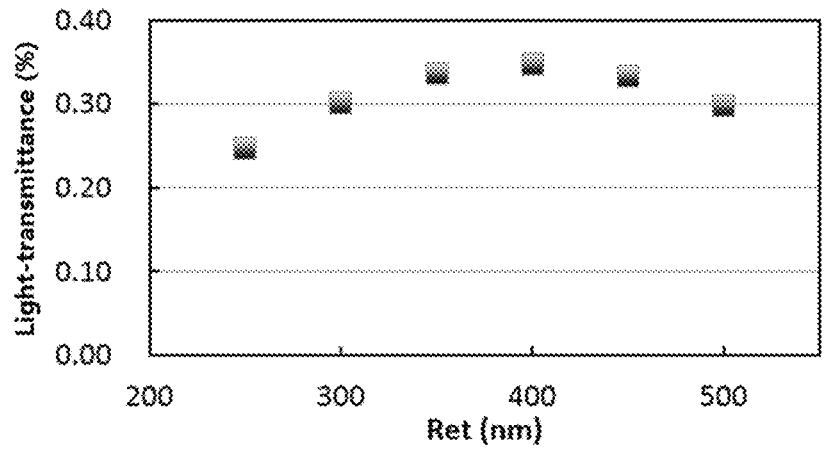
FIG. 10A is a diagram of the phase difference–light-transmittance relationship of the liquid crystal panel shown in FIGS. 2B-2D provided by the embodiments of the present disclosure.

FIG. 10A is a diagram of the phase difference–light-transmittance relationship of the liquid crystal panel shown in FIGS. 2B-2D provided by the embodiments of the present disclosure. As shown in FIG. 10A, in the case that the phase difference Ret is around 350~450 nm, better light-transmittance is obtained. Accordingly, if the birefringence coefficient $\Delta n$ of the liquid crystal in use is $\Delta n$=0.13, the gap between the first substrate S1 and the second substrate S2 of the liquid crystal panel is set as 2.7~3.5 µm, for example, 2.7~3.45 µm.

Figure 10B:
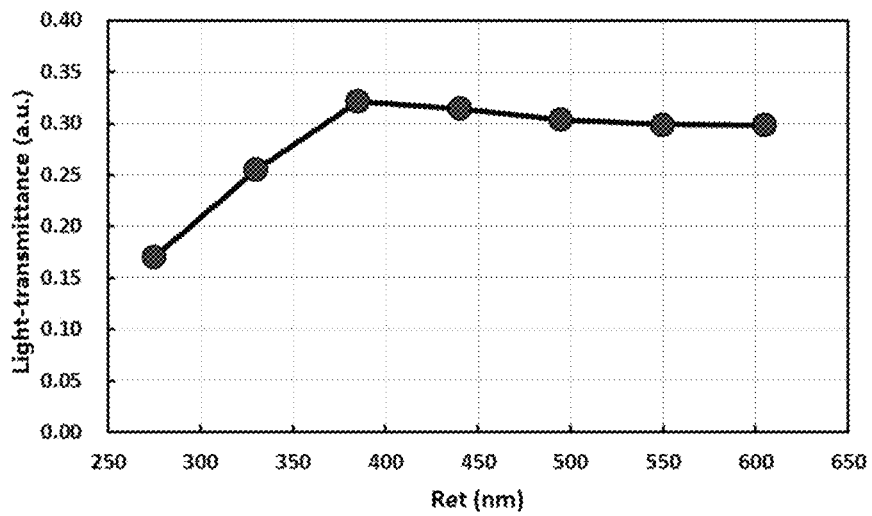
FIG. 10B is a diagram of the phase difference–light-transmittance relationship of the liquid crystal panel shown in FIGS. 3B-3G provided by the embodiments of the present disclosure.

FIG. 10B is a diagram of the phase difference–light-transmittance relationship of the liquid crystal panel shown in FIGS. 3B-3G provided by the embodiments of the present disclosure. As shown in FIG. 10B, in the case that Ret=400 nm, the optimal value of the light-transmittance is obtained. Accordingly, if the birefringence coefficient $\Delta n$ of the liquid crystal in use is $\Delta n$=0.13, the gap between the first substrate S1 and the second substrate S2 is approximately set as 3 µm. If the birefringence coefficient $\Delta n$ of the liquid crystal in use is $\Delta n$=0.114, the gap between the first substrate S1 and the second substrate S2 is approximately set as 3.5 µm.

In order to better illustrate the advantages of the liquid crystal panel in the embodiments of the present disclosure, taking the first electrode layer including the common electrode and the second electrode layer including the pixel electrode as an example in the liquid crystal panel shown in FIG. 3. The liquid crystal panel provided by the embodiments of the present disclosure is compared with the liquid crystal panel shown in FIG. 1.

Figure 11:
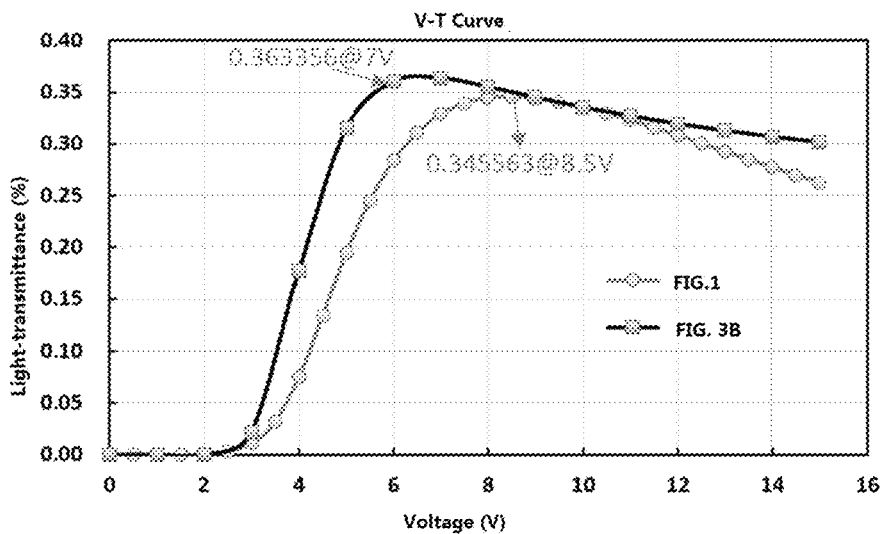
FIG. 11 is a simulated comparison diagram of V-T curves of the liquid crystal panels shown in FIGS. 1 and 3B.

FIG. 11 is a simulated comparison diagram of V-T curves of the liquid crystal panels shown in FIGS. 1 and 3B. Herein, the voltage in FIG. 11 represents the voltage of the pixel electrode in the case that the voltage of the common electrode is 0V. According to the simulation results, the liquid crystal panel shown in FIG. 1 has the maximum light-transmittance Tr=0.345563 at 8.5V, and the liquid crystal panel provided by the embodiments of the present disclosure has the maximum light-transmittance of 0.363356 at 7V, which is 5.2% higher than that of the liquid crystal panel shown in FIG. 1. Hence, the liquid crystal panel shown in FIG. 3B provided by the embodiments of the present disclosure achieves higher light-transmittance and lower driving voltage.

Figure 12A:
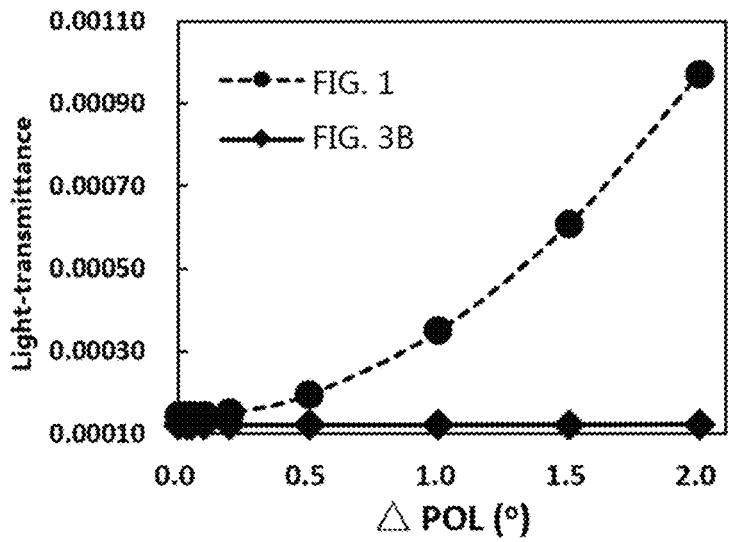
FIG. 12A is a comparison diagram of the light-transmittances of the liquid crystal panels shown in FIGS. 1 and 3B affected by an optical axis deviation of a polarizer in a dark state.
Figure 12B:
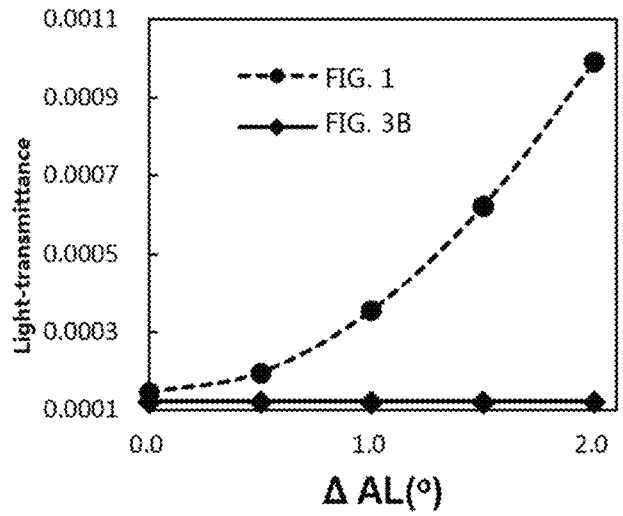
FIG. 12B is a comparison diagram of the light-transmittances of the liquid crystal panels shown in FIGS. 1 and 3B affected by a pre-tilt angle deviation of an alignment layer in the dark state.

FIG. 12A is a comparison diagram of the light-transmittances of the liquid crystal panels shown in FIGS. 1 and 3B affected by an optical axis deviation $\Delta$POL of the polarizer in a dark state. FIG. 12B is a comparison diagram of the light-transmittances of the liquid crystal panels shown in FIGS. 1 and 3B affected by a pre-tilt angle deviation $\Delta$AL of the alignment layer in the dark state. It can be seen from FIGS. 12A and 12B that for the brightness (L0) in the dark state, the L0 of the liquid crystal panel shown in FIG. 1 is more sensitive to the pre-tilt angle deviation $\Delta$AL of the alignment layer and the optical axis deviation $\Delta$POL of the polarizer, while the liquid crystal panel provided by the embodiments of the present disclosure has stronger stability in the dark state. Considering various optical axis deviations, the ratio of the dark state brightness (L0) of the liquid crystal panel shown in FIG. 1 to that of the liquid crystal panel provided by the embodiments of the present disclosure is 1.579/0.205≈7.7, so the liquid crystal panel provided by the embodiment of the present disclosure has lower light leakage in the dark state; moreover, it can be concluded that the contrast of the liquid crystal panel provided by the embodiments of the present disclosure is at least 7.7 times 0f that of the liquid crystal panel shown in FIG. 1. That is, the embodiments of the present disclosure achieves higher contrast in the case that using vertically aligned negative liquid crystals (for example, the contrast is at least 7.7 times of that of the liquid crystal panel shown in FIG. 1).

Figure 13A:
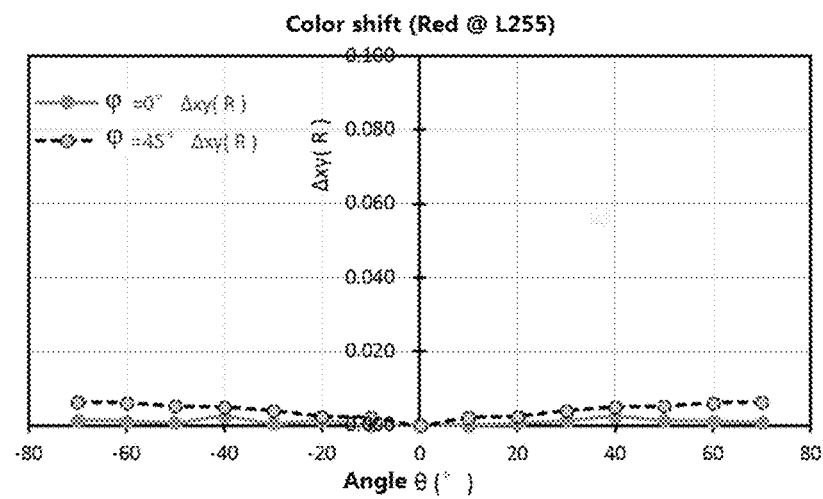
FIGS. 13A to 13C are viewing angle characteristic diagrams of the liquid crystal panel shown in FIG. 3B provided by the embodiments of the present disclosure in the case that a first electrode layer includes a common electrode and a second electrode layer includes a pixel electrode.
Figure 13B:
Figure 13C:
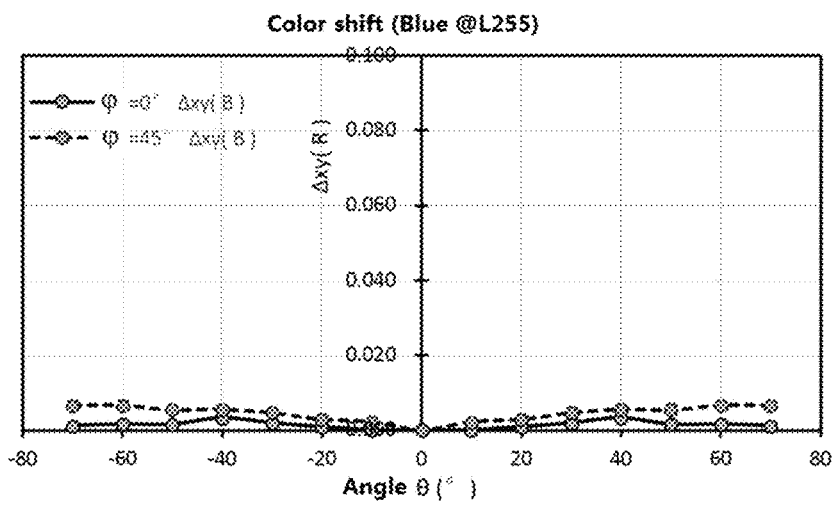

FIGS. 13A to 13C are viewing angle characteristic diagrams of the liquid crystal panel shown in FIG. 3B provided by the embodiments of the present disclosure in the case that the first electrode layer includes the common electrode and the second electrode layer includes the pixel electrode. Herein, $\theta$ represents a polar angle, and $\varphi$ represents an azimuth angle. It can be seen from FIGS. 13A to 13C that the red, green, and blue color shifts of the liquid crystal panel as shown in FIG. 3B provided by the embodiment of the present disclosure are all less than 0.04, that is, the liquid crystal panel in the embodiments of the present disclosure has a smaller color shift.

Figure 14:
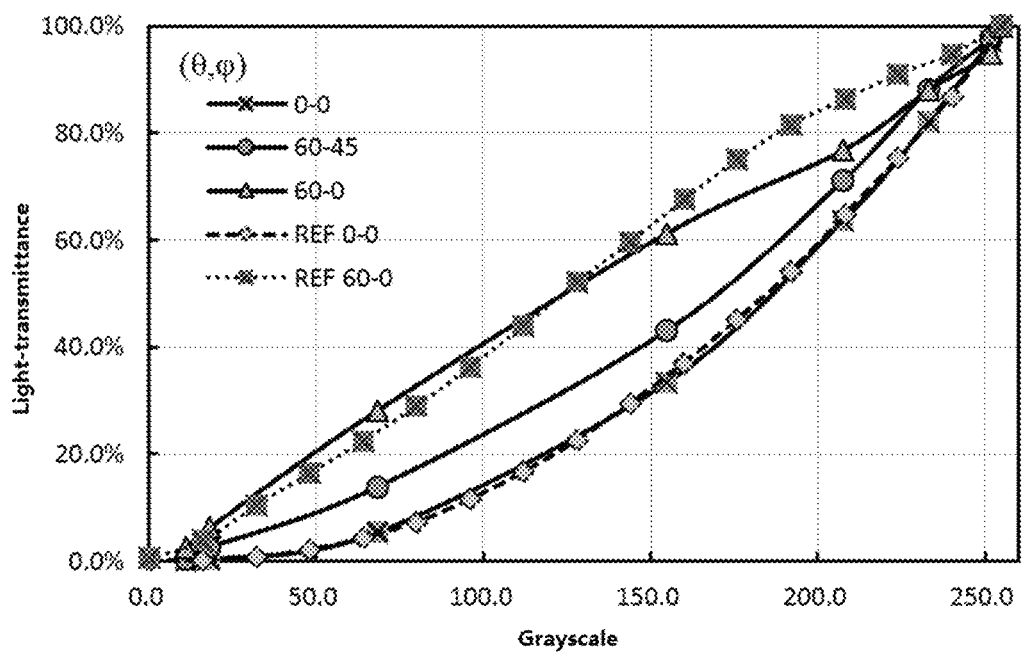
FIG. 14 is a Gamma comparison diagram of the liquid crystal panel shown in FIG. 3B provided by the embodiments of the present disclosure, wherein in the liquid crystal panel shown in FIG. 3B, the first electrode layer includes the common electrode and the second electrode layer includes the pixel electrode.

FIG. 14 is a Gamma comparison diagram of the liquid crystal panel shown in FIG. 3B provided by the embodiments of the present disclosure with the VA (vertical alignment) product, wherein in the liquid crystal panel shown in FIG. 3B, the first electrode layer includes the common electrode and the second electrode layer includes the pixel electrode; in the VA product, one of the common electrode and the pixel electrode is provided on the first substrate S1, and the other of the common electrode and the pixel electrode is provided on the first substrate S2. In FIG. 14, REF represents the VA mode product, $\theta$ represents the polar angle, and $\varphi$ represents the azimuth angle. It can be seen from FIG. 14 that the Gamma shift of the liquid crystal panel provided by the embodiments of the present disclosure is smaller than that of the VA mode product. In addition, compared with the VA mode product, the liquid crystal panel provided by the embodiments of the present disclosure has a better performance in Gamma curve at the side viewing angle, does not cause grayscale inversion, and does not need to perform pixel compensation. Hence, the liquid crystal panel provided by the embodiments of the present disclosure is simpler than the VA mode product in terms of pixel design, and the liquid crystal panel provided by the embodiments of the present disclosure does not occupy too much area of the display area, which achieves a higher aperture ratio and is more beneficial to achieve high resolution.

The embodiments of the present disclosure further provide the liquid crystal panel. For example, as shown in FIGS. 3A to 3G, the liquid crystal panel includes the first substrate S1, the second substrate S2, and the liquid crystal layer LC located between the first substrate S1 and the second substrate S2. The first substrate S1 includes the first base substrate BS1, and the pixel electrode PE and the common electrode CE located on the first base substrate BS1. The second substrate S2 is opposed to the first substrate S1; the second substrate S2 includes the second base substrate BS2 and the enhancement electrode (for example, the first enhancement electrode E3) located on the second base substrate BS2. The enhancement electrode is configured in such a way that the non-zero voltage difference is generated between the enhancement electrode and at least one of the pixel electrode PE and the common electrode CE. In the embodiments of the present disclosure, the arrangement of the pixel electrode, the common electrode, and the enhancement electrode for example adopts the arrangement of the pixel electrode, the common electrode and the first enhancement electrode E3 in any of the above-mentioned embodiments, so the repetition will not be elaborated.

The embodiments of the present disclosure further provide a display device, which includes the liquid crystal panel provided in any of the above-mentioned embodiments and a backlight source, the backlight source is located on the side of the first substrate facing away from the second substrate.

Figure 15:
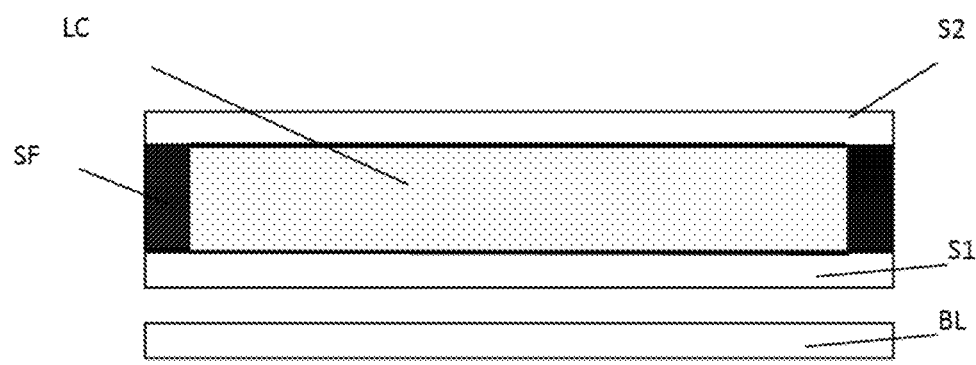
FIG. 15 is a schematic diagram of a display device provided by the embodiments of the present disclosure.

For example, as shown in FIG. 15, in the display device, the liquid crystal panel includes the first substrate S1 and the second substrate S2. The first substrate S1 and the second substrate S2 are opposed to each other and are sealed by the sealant SF to form a liquid crystal cell. The liquid crystal cell is filled with a liquid crystal material to form the liquid crystal layer LC. The display device further includes the backlight source BL for providing a backlight for the liquid crystal panel, which is located on the side of the first substrate S1 facing away from the second substrate S2, that is, the first substrate S1 is located between the second substrate S2 and the backlight source BL.

For example, the backlight source BL includes a light guide plate and a light source. For example, the light source is located on a side of the light guide plate facing away from the liquid crystal panel (that is, the backlight source is a direct-type backlight source), or the light emitted by the light source enters the light guide plate from a side surface of the light guide plate (that is, the backlight source is a side-type backlight source).

For example, the display device provided by the embodiments of the present disclosure is any product or component with a display function, such as a mobile phone, a tablet computer, a television, a monitor, a laptop computer, a digital photo frame, a navigator, and the like.

The embodiments of the present disclosure further provides a driving method of the liquid crystal panel as shown in FIGS. 3A to 3G. The driving method includes: applying a common electrode signal to the common electrode CE of the first substrate S1; applying a pixel electrode signal to the pixel electrode PE of the first substrate S1; and applying a signal to the first enhancement electrode E3 of the second substrate S2, the signal is different from the pixel electrode signal and the common electrode signal (for example, the signal is the constant signal or the variable signal), so that a non-zero voltage difference is generated between the first enhancement electrode E3 and at least one of the pixel electrode PE and the common electrode CE. Thus, the vertical electric field is formed between the first enhancement electrode E3 and the at least one of the pixel electrode PE and the common electrode CE. For example, during operation, the non-zero voltage difference is generated between the first enhancement electrode E3 and only the pixel electrode PE; alternatively, the non-zero voltage difference is generated between the first enhancement electrode E3 and only the common electrode CE; alternatively, the non-zero voltage difference is generated between the first enhancement electrode E3 and each of the pixel electrode PE and the common electrode CE.

For example, in a case where the second substrate S2 further includes the second enhancement electrode E4, the driving method further includes: applying different signals to the first enhancement electrode E3 and the second enhancement electrode E4 of the second substrate S2 respectively, so that the non-zero electric field is formed between the enhancement electrode E3 and the second enhancement electrode E4.

In the driving method of the embodiments, the arrangement of the pixel electrode PE, the common electrode CE, the first enhancement electrode E3, and the fourth enhancement electrode E4 and manner in which the signal is applied for example adopt those described in the afore-mentioned embodiments of the liquid crystal panel, which will not be elaborated here.

In the disclosure, the following should be noted: (1) the accompanying drawings involve only the structure(s) in connection with the embodiment(s) of the present disclosure, and other structure(s) may be referred to common design(s); (2) in case of no conflict, the embodiments of the present disclosure or the features in the embodiments may be combined with each other.

What is described above is related to the exemplary embodiments of the disclosure only and not limitative to the scope of the disclosure; the scope of the disclosure is defined by the accompanying claims.

The invention claimed is:

1. A liquid crystal panel, comprising:
a first substrate, comprising a first base substrate, and a pixel electrode and a common electrode provided on the first base substrate;
a second substrate, opposed to the first substrate and comprising a second base substrate; and
a liquid crystal layer, provided between the first substrate and the second substrate in a direction perpendicular to the first base substrate,
wherein an initial alignment of liquid crystal in the liquid crystal layer is vertical alignment;
the first substrate further comprises a first electrode layer and a second electrode layer sequentially provided on a side of the first base substrate facing toward the liquid crystal layer, the first electrode layer is provided between the first base substrate and the second electrode layer in the direction perpendicular to the first base substrate;
the second electrode layer comprises a plurality of second electrode strips provided at intervals, and one of the pixel electrode and the common electrode is provided in the second electrode layer and comprises the plurality of second electrode strips;
the other of the pixel electrode and the common electrode is provided in the first electrode layer and comprises a part that extends beyond the second electrode layer in a direction parallel to the first base substrate;
the second substrate further comprises a first enhancement electrode provided on a side of the second base substrate facing toward the liquid crystal layer;
the first enhancement electrode is configured in such a way that a non-zero voltage difference is generated between the first enhancement electrode and at least one of the pixel electrode and the common electrode during operation of the liquid crystal panel
the first enhancement electrode comprises a plurality of third electrode strips provided at intervals, and orthographic projections of the plurality of third electrode strips on the first base substrate are staggered with orthographic projections of the plurality of second electrode strips on the first base substrate.

2. The liquid crystal panel according to claim 1, wherein the first substrate comprises a first alignment layer provided on the first base substrate, and the second substrate comprises a second alignment layer provided on the second base substrate;
each of the first alignment layer and the second alignment layer is in direct contact with the liquid crystal layer, and the first alignment layer and the second alignment layer are configured to allow the initial alignment of the liquid crystal to be vertical alignment.

3. The liquid crystal panel according to claim 1, wherein the liquid crystal in the liquid crystal layer is negative liquid crystal.

4. The liquid crystal panel according to claim 1, wherein the first electrode layer comprises a plate-shaped structure which is continuous, and orthographic projections of the plurality of second electrode strips on the first base substrate are within an orthographic projection of the plate-shaped structure on the first base substrate.

5. The liquid crystal panel according to claim 1, wherein the first electrode layer comprises a plurality of first electrode strips provided at intervals, and the other of the pixel electrode and the common electrode comprises the plurality of first electrode strips;
orthographic projections of the plurality of first electrode strips on the first base substrate partially overlap orthographic projections of the plurality of second electrode strips on the first base substrate.

6. The liquid crystal panel according to claim 1, wherein the first electrode layer comprises a plurality of first electrode strips provided at intervals, and the other of the pixel electrode and the common electrode comprises the plurality of first electrode strips;
orthographic projections of the plurality of first electrode strips on the first base substrate are outside orthographic projections of the plurality of second electrode strips on the first base substrate.

7. The liquid crystal panel according to claim 1, wherein the first enhancement electrode further comprises a plate-shaped structure which is continuous, and orthographic projections of the plurality of second electrode strips on the first base substrate are within an orthographic projection of the first enhancement electrode of the plate-shaped structure on the first base substrate.

8. The liquid crystal panel according to claim 1, wherein the first enhancement electrode is configured to be applied with a signal during the operation of the liquid crystal panel, the signal is different from a signal applied to the pixel electrode and is different from a signal applied to the common electrode during the operation of the liquid crystal panel.

9. The liquid crystal panel according to claim 1, wherein the first enhancement electrode is electrically connected to the common electrode; or, the first enhancement electrode is electrically connected to the pixel electrode.

10. The liquid crystal panel of claim 9, wherein
the liquid crystal panel further comprises a sealant configured for connecting the first substrate to the second substrate, an electrically-conductive connection portion is provided in the sealant, and the first enhancement electrode is electrically connected to the pixel electrode or the common electrode through the electrically-conductive connection portion; or,
the liquid crystal panel further comprises a plurality of spacers provided between the first substrate and the second substrate, and the first enhanced electrode is electrically connected with the pixel electrode or the common electrode at a position of a spacer, closest to an edge of the liquid crystal panel, among the plurality of spacers.

11. The liquid crystal panel according to claim 1, wherein each of the plurality of second electrode strips has a width ranged from 2.0 microns to 3.8 microns, and a spacing between adjacent second electrode strips is ranged from 1.8 microns to 5.4 microns.

12. The liquid crystal panel according to claim 1, wherein each of the plurality of second electrode strips has a width ranged from 1.9 microns to 3.3 microns, and a spacing between adjacent second electrode strips is ranged from 2.3 microns to 4.8 microns.

13. The liquid crystal panel according to claim 1, wherein the first substrate further comprises an insulating layer, the insulating layer is provided between the first electrode layer and the second electrode layer in the direction perpendicular to the first substrate, and the insulating layer has a thickness ranged from 100 mm~2000 nm.

14. The liquid crystal panel according to claim 1, wherein
the pixel electrode and the common electrode are provided in a same layer;
the second substrate further comprises a first enhancement electrode provided on a side of the second base substrate facing toward the liquid crystal layer;
the first enhancement electrode is configured in such a way that a non-zero voltage difference is generated between the first enhancement electrode and at least one of the pixel electrode and the common electrode during operation of the liquid crystal panel.

15. The liquid crystal panel according to claim 1, wherein
the second substrate further comprises a second enhancement electrode provided on the second base substrate and insulated from the first enhancement electrode;
the first enhancement electrode and the second enhancement electrode are configured to be applied with different signals during the operation of the liquid crystal panel.

16. The liquid crystal panel according to claim 15, wherein one of the first enhancement electrode and the second enhancement electrode is electrically connected to the pixel electrode, and the other of the first enhancement electrode and the second enhancement electrodes is electrically connected to the common electrode.

17. A display device, comprising:
a liquid crystal panel, the liquid crystal panel comprises:
a first substrate, comprising a first base substrate, and a pixel electrode and a common electrode provided on the first base substrate;
a second substrate, opposed to the first substrate and comprising a second base substrate; and
a liquid crystal layer, provided between the first substrate and the second substrate in a direction perpendicular to the first base substrate,
wherein an initial alignment of liquid crystal in the liquid crystal layer is vertical alignment;
the first substrate further comprises a first electrode layer and a second electrode layer sequentially provided on a side of the first base substrate facing toward the liquid crystal layer, the first electrode layer is provided between the first base substrate and the second electrode layer in the direction perpendicular to the first base substrate;
the second electrode layer comprises a plurality of second electrode strips provided at intervals, and one of the pixel electrode and the common electrode is provided in the second electrode layer and comprises the plurality of second electrode strips;
the other of the pixel electrode and the common electrode is provided in the first electrode layer and comprises a part that extends beyond the second electrode layer in a direction parallel to the first base substrate;
the second substrate further comprises a first enhancement electrode provided on a side of the second base substrate facing toward the liquid crystal layer;
the first enhancement electrode is configured in such a way that a non-zero voltage difference is generated between the first enhancement electrode and at least one of the pixel electrode and the common electrode during operation of the liquid crystal panel;
the first enhancement electrode comprises a plurality of third electrode strips provided at intervals, and orthographic projections of the plurality of third electrode strips on the first base substrate are staggered with orthographic projections of the plurality of second electrode strips on the first base substrate; and
a backlight source,
wherein the backlight source is provided on a side of the first substrate facing away from the second substrate.

* * * * *